(12) United States Patent
Yoshimura et al.

(10) Patent No.: US 12,336,038 B2
(45) Date of Patent: Jun. 17, 2025

(54) TERMINAL APPARATUS, BASE STATION APPARATUS, AND COMMUNICATION METHOD

(71) Applicant: SHARP KABUSHIKI KAISHA, Sakai (JP)

(72) Inventors: Tomoki Yoshimura, Sakai (JP); Shoichi Suzuki, Sakai (JP); Toshizo Nogami, Sakai (JP); Wataru Ouchi, Sakai (JP); Taewoo Lee, Sakai (JP); Huifa Lin, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 281 days.

(21) Appl. No.: 17/425,548

(22) PCT Filed: Jan. 24, 2020

(86) PCT No.: PCT/JP2020/002530
§ 371 (c)(1),
(2) Date: Jul. 23, 2021

(87) PCT Pub. No.: WO2020/153482
PCT Pub. Date: Jul. 30, 2020

(65) Prior Publication Data
US 2022/0132620 A1 Apr. 28, 2022

(30) Foreign Application Priority Data
Jan. 24, 2019 (JP) .................... 2019-010206

(51) Int. Cl.
*H04W 76/27* (2018.01)
(52) U.S. Cl.
CPC .................... *H04W 76/27* (2018.02)
(58) Field of Classification Search
None
See application file for complete search history.

(56) References Cited

U.S. PATENT DOCUMENTS 10,757,710 B2 * 8/2020 Zhou ............... H04W 72/21
2018/0288746 A1 10/2018 Zhang et al.
(Continued)

FOREIGN PATENT DOCUMENTS

| CN | 108886804 A | 11/2018 |
| WO | 2018175577 A1 | 9/2018 |
| WO | 2018199079 A1 | 11/2018 |

OTHER PUBLICATIONS

Nokia et al: "Configuration of channel BW in RRC", 3GPP Draft; R4-1814859 Channel BW Configuration Aspects RAN4_TH, 3rd Generation Partnership Project (3GPP), Mobile Competence Centre; 650, Route Des Lucioles; F-06921 Sophia-Antipolis Cedex; France vol. RAN WG4, No. Spokane, USA; Nov. 12, 2018-Nov. 16, 2018 Nov. 11, 2018 (Nov. 11, 2018), section 2.1-section 2.3.
(Continued)

*Primary Examiner* — Brian S Roberts
(74) *Attorney, Agent, or Firm* — ScienBiziP, P.C.

(57) ABSTRACT

Methods for a terminal apparatus are disclosed, comprising: receiving a transmission band configuration, wherein the transmission band configuration is provided by an initial downlink bandwidth part (DL BWP) in case that at least one predetermined condition is satisfied, the transmission band configuration is provided by a dedicated radio resource control (RRC) message in case that the at least one predetermined condition is not satisfied, the predetermined condition includes a dedicated RRC parameter is not provided, the terminal apparatus is in idle mode, the terminal apparatus performs an initial connection, the terminal apparatus does not support at least one of one or more carrier bands based on a parameter in a common RRC message, the terminal apparatus supports a band of the initial DL BWP, and the terminal apparatus supports a band of a control resource set with an index equals to zero.

6 Claims, 12 Drawing Sheets

(56) References Cited

U.S. PATENT DOCUMENTS

2019/0208507 A1* 7/2019 Xiong ................... H04L 69/324
2019/0261425 A1* 8/2019 Park ...................... H04L 5/0098
2019/0313437 A1* 10/2019 Jung .................... H04L 5/0042
2020/0127786 A1* 4/2020 Kwak ................... H04L 5/0051
2020/0252934 A1* 8/2020 Xue ...................... H04W 72/23
2020/0314946 A1* 10/2020 Tsuboi ................. H04W 24/10

OTHER PUBLICATIONS

NTT DOCOMO, "New SID Proposal: Study on New Radio Access Technology", RP-160671 3GPP TSG RAN Meeting #71, Göteborg, Sweden, Mar. 7-10, 2016.
Qualcomm Incorporated, "UE specific channel bandwidth signaling", RP-182896 3GPP TSG-RAN Meeting #82, Sorrento, Italy, Nov. 12-16, 2018.
Huawei, HiSilicon, "On channel bandwidth signalling", R4-1815903 3GPP TSG-RAN WG4 Meeting #89, Spokane, USA, Nov. 12-16, 2018.

* cited by examiner

Number of OFDM symbols per slot, slots per frame, and slots per subframe for nomal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 2A

Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2B

| PUCCH format | Length in OFDM symbols $N^{PUCCH}_{symb}$ |
|---|---|
| 0 | 1 - 2 |
| 1 | 4 - 14 |
| 2 | 1 - 2 |
| 3 | 4 - 14 |
| 4 | 4 - 14 |

FIG. 4

| SCS (kHz) | 5MHz $N_{RB}$ | 10MHz $N_{RB}$ | 15MHz $N_{RB}$ | 20 MHz $N_{RB}$ | 25 MHz $N_{RB}$ | 30MHz $N_{RB}$ | 40 MHz $N_{RB}$ | 50MHz $N_{RB}$ | 60 MHz $N_{RB}$ | 80 MHz $N_{RB}$ | 90MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

FIG. 9

| SCS (kHz) | 5MHz | 10 MHz | 15 MHz | 20 MHz | 25 MHz | 30MHz | 40 MHz | 50MHz | 60 MHz | 80MHz | 90MHz | 100MHz |
|---|---|---|---|---|---|---|---|---|---|---|---|---|
| 15 | 242.5 | 312.5 | 382.5 | 452.5 | 522.5 | 592.5 | 552.5 | 692.5 | N/A | N/A | N/A | N/A |
| 30 | 505 | 665 | 645 | 805 | 785 | 945 | 905 | 1045 | 825 | 925 | 885 | 845 |
| 60 | N/A | 1010 | 990 | 1330 | 1310 | 1290 | 1610 | 1570 | 1530 | 1450 | 1410 | 1370 |

FIG. 10

TERMINAL APPARATUS, BASE STATION APPARATUS, AND COMMUNICATION METHOD

CROSS-REFERENCE TO RELATED APPLICATION

The present application claims priority based on Japanese Patent Application No. 2019-10206 filed on Jan. 24, 2019, the content of which is incorporated herein by reference.

FIELD

The present invention relates to a terminal apparatus, a base station apparatus, and a communication method.

BACKGROUND

A radio access scheme and a wireless network for cellular mobile communication (hereinafter, referred to as "Long Term Evolution (LTE)" or "Evolved Universal Terrestrial Radio Access (EUTRA)") have been studied in the 3rd Generation Partnership Project (3GPP). In LTE, a base station apparatus is referred to as an eNodeB, and a terminal apparatus is also referred to as a UE (User Equipment). LTE is a cellular communication system in which areas covered by a plurality of base station apparatuses are arranged in a cell-like configuration. A single base station apparatus may also manage multiple serving cells.

In the 3GPP, a next generation standard (New Radio (NR)) (NPL 1) is being studied in order to make a proposal for International Mobile Telecommunication (IMT)-2020, a standard for a next-generation mobile communication system, standardized by the International Telecommunication Union (ITU). NR is required to satisfy requirements for three scenarios including eMBB (enhanced Mobile BroadBand), mMTC (massive Machine Type Communication), and URLLC (Ultra Reliable and Low Latency Communication) in a single technology framework.

PRIOR ART LITERATURE

Non-Patent Literature

NPL 1: "New SID proposal: Study on New Radio Access Technology", RP-160671, NTT docomo, 3GPP TSG RAN Meeting #71, Goteborg, Sweden, Mar. 7-10, 2016.

SUMMARY

Technical Problem

The present invention provides a terminal apparatus that performs communication efficiently, a communication method for the terminal apparatus, a base station apparatus that performs communication efficiently, and a communication method for the base station apparatus.

Solution to Problem (1) The first aspect of the present invention is to provide a terminal apparatus comprising: a receiver configured to receive a transmission band configuration, wherein the transmission band configuration is provided by an initial downlink bandwidth part (DL BWP) in case that at least one predetermined condition is satisfied, the transmission band configuration is provided by a dedicated radio resource control (RRC) message in case that the at least one predetermined condition is not satisfied, the predetermined condition includes a dedicated RRC parameter is not provided, the terminal apparatus is in idle mode, the terminal apparatus performs an initial connection, the terminal apparatus does not support at least one of one or more carrier bands based on a parameter in a common RRC message, the terminal apparatus supports a band of the initial DL BWP, and the terminal apparatus supports a band of a control resource set with an index equals to zero.

(2) The second aspect of the present invention is to provide a communication method for a terminal apparatus. The communication method comprises: receiving a transmission band configuration, wherein the transmission band configuration is provided by an initial DL BWP in case that at least one predetermined condition is satisfied, the transmission band configuration is provided by a dedicated RRC message in case that the at least one predetermined condition is not satisfied, the predetermined condition includes a dedicated RRC parameter is not provided, the terminal apparatus is in idle mode, the terminal apparatus performs an initial connection, the terminal apparatus does not support at least one of one or more carrier bands based on a parameter in a common RRC message, the terminal apparatus supports a band of the initial DL BWP, and the terminal apparatus supports a band of a control resource set with an index equals to zero.

(3) The third aspect of the present invention is to provide a communication method for a terminal apparatus. The communication method comprises: receiving a transmission band configuration, wherein the transmission band configuration is provided based on a first parameter included in a common RRC message, and a DL BWP configuration is provided based on a second parameter in a dedicated RRC message.

Invention Effect

According to one aspects of the present invention, the terminal apparatus can perform communication efficiently. In addition, the base station apparatus can perform communication efficiently.

BRIEF DESCRIPTION OF THE DRAWINGS

FIG. 2A is an example showing a relationship among $N^{slot}_{symb}$, a subcarrier spacing configuration μ, and a CP configuration according to one aspect of the present embodiment.

FIG. 2B is an example showing a relationship among $N^{slot}_{symb}$, a subcarrier spacing configuration μ, and a CP configuration according to one aspect of the present embodiment.

FIG. 4 is a schematic diagram showing an example of a relationship between a Physical Uplink Control CHannel (PUCCH) format and the length $N^{PUCCH}_{symb}$ of the PUCCH format according to one aspect of the present embodiment.

FIG. 9 is a diagram showing a configuration example of a maximum number $N_{RB}$ of resource blocks of a transmission bandwidth configuration according to one aspect of the present embodiment.

FIG. 10 is a diagram showing a configuration example of a minimum value of a guard band configured for a channel bandwidth according to one aspect of the present embodiment.

DETAILED DESCRIPTION OF THE PREFERRED EMBODIMENTS

Hereinafter, the embodiments of the present invention will be described.

The term "A and/or B" may be a term that includes "A", "B", or "A and B".

Figure 1:
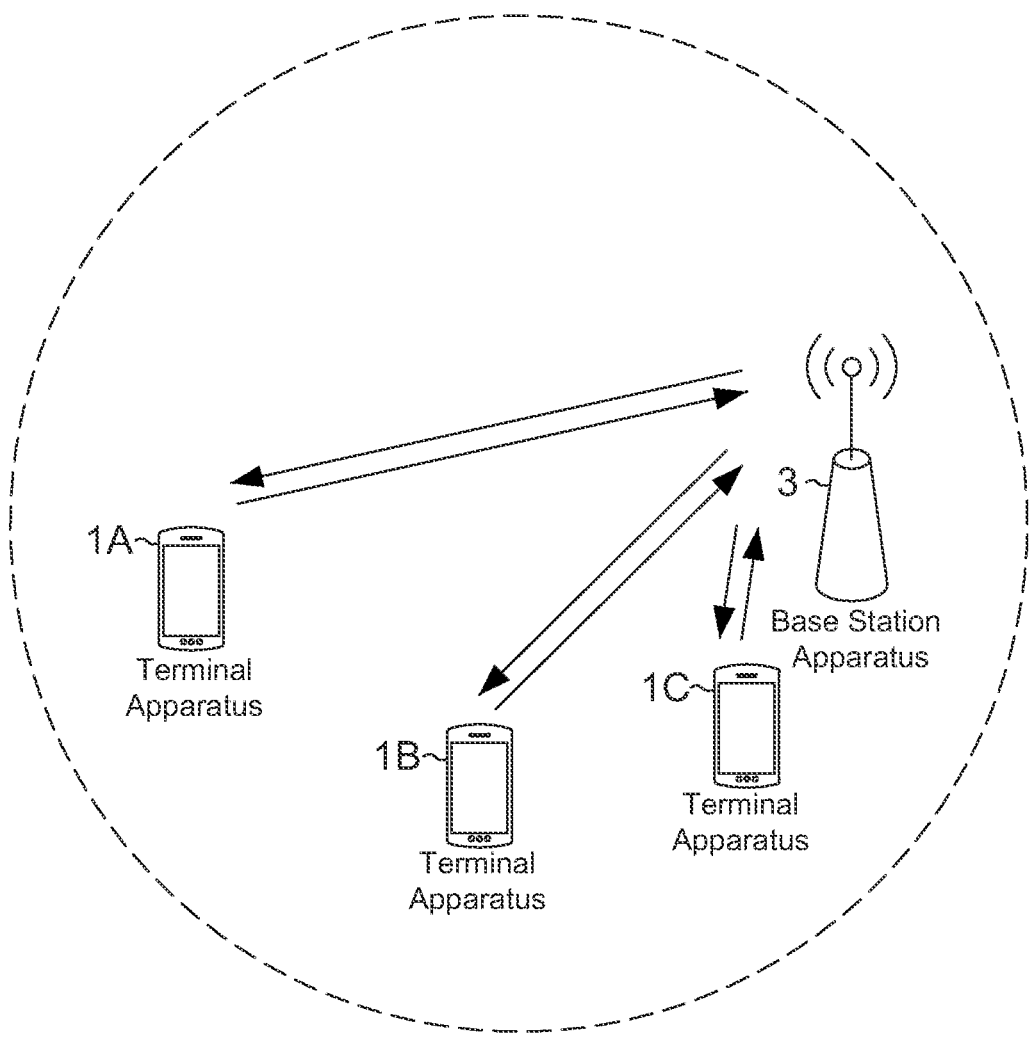
FIG. 1 is a conceptual diagram of a wireless communication system according to one aspect of the present embodiment.

FIG. 1 is a conceptual diagram of a wireless communication system according to one aspect of the present embodiment. In FIG. 1, the wireless communication system includes terminal apparatuses 1A to 1C and a base station apparatus 3 (BS #3: Base Station #3). Hereinafter, the terminal apparatuses 1A to 1C are refer to as a terminal apparatus 1 (UE #1: User Equipment #1).

The base station apparatus 3 may be configured to include one or both of an MCG (Master Cell Group) and an SCG (Secondary Cell Group). The MCG is a group of serving cells that include at least a PCell (Primary Cell). The SCG is a group of serving cells that include at least a PSCell (Primary Secondary Cell). The PCell may be a serving cell given based on an initial connection. The PCell may also be a serving cell where an initial connection is performed. The MCG may also include one or more SCells (Secondary cells). The SCG may also include one or more SCells. The PCell is also referred to as a primary cell. The PScell is also referred to as a primary secondary cell. The SCell is also referred to as a secondary cell.

The MCG may also include serving cells in an EUTRA. The SCG may also include serving cells in a next generation standard (New Radio (NR)).

A frame configuration will be described below.

In a wireless communication system according to one aspect of the present embodiment, at least OFDM (Orthogonal Frequency Division Multiplexing) is used. An OFDM symbol is a unit of an OFDM time domain. An OFDM symbol includes at least one or more subcarriers. An OFDM symbol may also be converted into a time-continuous signal in generation of a baseband signal. In a downlink, at least CP-OFDM (Cyclic Prefix Orthogonal Frequency Division Multiplexing) is used. In an uplink, either CP-OFDM or DFT-s-OFDM (Discrete Fourier Transform-Spread-Orthogonal Frequency Division Multiplexing) is used. The DFT-s-OFDM is given by applying transform precoding to the CP-OFDM.

The OFDM symbol may also be a term including a CP attached to the OFDM symbol. In other words, a certain OFDM symbol may be configured to include the certain OFDM symbol and a CP attached to the certain OFDM symbol.

A subcarrier spacing (SCS) may be given by the subcarrier spacing $\Delta f = 2^\mu \cdot 15$ kHz. For example, a subcarrier spacing configuration $\mu$ may be configured to be any one of 0, 1, 2, 3, 4, and/or 5. For a certain BWP (BandWidth Part), the subcarrier spacing configuration $\mu$ may be given by a higher layer parameter.

In a wireless communication system according to one aspect of the present embodiment, a time unit $T_c$ may be used to represent the length of a time domain. The time unit $T_c$ may be given by $T_c = 1/(\Delta f_{max} \cdot N_f)$. $\Delta f_{max}$ may be the maximum value of the subcarrier spacing supported in the wireless communication system according to one aspect of the present embodiment. $\Delta f_{max}$ may be $\Delta f_{max} = 480$ kHz. $N_f$ may be $N_f = 4096$. A constant $\kappa$ is $\kappa = \Delta f_{max} \cdot N_f / (\Delta f_{ref} N_{f,ref}) = 64$. $\Delta f_{ref}$ may be 15 kHz. $N_{f,ref}$ may be 2048.

The constant $\kappa$ may be a value indicating a relationship between a reference subcarrier spacing and $T_c$. The constant $\kappa$ may be used for a length of a subframe. The number of slots included in the subframe may be given at least based on the constant $\kappa$. $\Delta f_{ref}$ is the reference subcarrier spacing, and $N_{f,ref}$ is a value corresponding to the reference subcarrier spacing.

The transmission of a signal on a downlink and/or the transmission of a signal on an uplink may be organized into 10 ms frames. A frame includes 10 subframes. The length of a subframe is 1 ms. The length of a frame may be given independently of the subcarrier spacing $\Delta f$. In other words, the length of a frame may be given independently of $\mu$. The length of a subframe may be given independently of the subcarrier spacing $\Delta f$. In other words, the length of a subframe may be given independently of $\mu$.

For a certain subcarrier spacing configuration $\mu$, the number and indexes of slots included in a subframe may be given. For example, a slot number $n^\mu_s$ may be given by an integer value in ascending order in a range from 0 to $N^{subframe,\mu}_{slot}-1$ within a subframe. For a subcarrier spacing configuration $\mu$, the number and indexes of slots included in a frame may be given. In addition, a slot number $n^\mu_s$ may be given by an integer value in ascending order in a range from 0 to $N^{frame,\mu}_{slot}-1$ within a frame. $N^{slot}_{symb}$ consecutive OFDM symbols may be included in one slot. $N^{slot}_{symb}$ may be given at least based on some or all of CP (Cyclic Prefix) configurations. The CP configuration may be given at least based on a higher layer parameter. The CP configuration may be given at least based on dedicated RRC signaling. The slot number is also referred to as a slot index.

FIG. 2A is an example showing a relationship among $N^{slot}_{symb}$, a subcarrier spacing configuration and a CP configuration according to one aspect of the present embodiment. FIG. 2B is an example showing a relationship among $N^{slot}_{symb}$, a subcarrier spacing configuration $\mu$, and a CP configuration according to one aspect of the present embodiment. In FIG. 2A, for example, when the subcarrier spacing configuration $\mu$ is 2 and the CP configuration is a normal CP (normal cyclic prefix), $N^{slot}_{symb}=14$, $N^{frame,\mu}_{slot}=40$, and $N^{subframe,\mu}_{slot}=4$. In addition, in FIG. 2B, for example, when the subcarrier spacing configuration $\mu$ is 2 and the CP configuration is an extended CP (extended cyclic prefix), $N^{slot}_{symb}=12$, $N^{frame,\mu}_{slot}=40$, and $N^{subframe,\mu}_{slot}=4$.

Physical resources will be described below.

An antenna port is defined in such a manner that a channel on which a symbol is transmitted on one antenna port can be inferred from a channel on which another symbol is transmitted on the same antenna port. In a case that a large scale property of a channel on which a symbol is transmitted on one antenna port can be inferred from a channel on which a symbol is transmitted on another antenna port, the two antenna ports are referred to as being QCL (Quasi Co-Located). The large scale property may include at least a long term property of a channel. The large scale property may include at least some or all of delay spread, Doppler spread, Doppler shift, average gain, average delay, and spatial Rx parameters. The fact that a first antenna port and a second antenna port are QCL with respect to a beam parameter may mean that a reception beam assumed by the reception side for the first antenna port may be the same as a reception beam assumed by the reception side for the second antenna port. The fact that a first antenna port and a second antenna port are QCL with respect to a beam parameter may mean that a transmission beam assumed by the reception side for the first antenna port may be the same as a transmission beam assumed by the reception side for the second antenna port. In a case that a large scale property of a channel on which a symbol on one antenna port is transmitted can be inferred from a channel on which a symbol on another antenna port is transmitted, the terminal apparatus 1 may assume the two antenna ports to be QCL. The fact that two antenna ports are QCL may mean that the two antenna ports are assumed to be QCL.

A resource grid defined by $N^{size,\mu}_{grid,x} N^{RB}_{SC}$ subcarriers and $N^{subframe,\mu}_{symb}$ OFDM symbols is given for a subcarrier spacing configuration and a carrier set. $N^{size,\mu}_{grid,x}$ may indicate the number of resource blocks given for the subcarrier spacing configuration $\mu$. $N^{size,\mu}_{grid,x}$ may also represent the bandwidth of a carrier. $N^{size,\mu}_{grid,x}$ may also correspond to the value of a higher layer parameter CarrierBandwidth. The carrier x may indicate either a downlink carrier or an uplink carrier. In other words, x may be either "DL" or "UL". $N^{RB}_{SC}$ may indicate the number of subcarriers included in one resource block. $N^{RB}_{SC}$ may be 12. At least one resource grid may be given for each antenna port p and/or for each subcarrier spacing configuration $\mu$ and/or for each transmission direction configuration. The transmission direction includes at least a downlink (DL) and an uplink (UL). Hereinafter, a set of parameters including at least some or all of the antenna port p, the subcarrier spacing configuration and the transmission direction configuration is also referred to as a first radio parameter set. In other words, one resource grid may be given for each first radio parameter set.

A resource block is a general term for a common resource block and a physical resource block. For example, the index of the resource block may also be given in ascending order from a reference point. A resource block corresponding to a certain subcarrier spacing configuration $\mu$ may be a resource block including resource elements given based on the subcarrier spacing configuration $\mu$.

In the downlink, a carrier included in a serving cell is referred to as a downlink carrier (or a downlink component carrier). In the uplink, a carrier included in a serving cell is referred to as an uplink carrier (an uplink component carrier). The downlink component carrier and the uplink component carrier are collectively referred to as a component carrier (or a carrier).

The type of the serving cell may be any one of a PCell, a PSCell, and a SCell. The PCell may be a serving cell identified at least based on a cell ID acquired from a Synchronization Signal (SS)/Physical Broadcast Channel (PBCH) in an initial connection. The PCell may be at least configured with a Random Access Channel (RACH) resource. The SCell may be a serving cell used in carrier aggregation. The SCell may be a serving cell given at least based on dedicated Radio Resource Control (RRC) signaling.

Each element in the resource grid given for each first radio parameter set is referred to as a resource element. The resource element is identified at least based on a frequency domain index $k_{sc}$ and a time domain index $l_{sym}$. For a certain first radio parameter set, the resource element is identified at least based on a frequency domain index $k_{sc}$ and a time domain index $l_{sym}$. The resource element identified by the frequency domain index $k_{sc}$ and the time domain index $l_{sym}$ is also referred to as a resource element ($k_{sc}$, $l_{sym}$). The frequency domain index $k_{sc}$ indicates any of values from 0 to $N^{\mu}_{RB} N^{RB}_{sc}-1$. $N^{\mu}_{RB}$ may be the number of resource blocks given for the subcarrier spacing configuration $N^{\mu}_{RB}$ may also be $N^{size,\mu}_{grid,x}$. $N^{RB}_{SC}$ may be the number of subcarriers included in a resource block, and $N^{RB}_{SC}=12$. The frequency domain index $k_{sc}$ may correspond to a subcarrier index $k_{sc}$. The time domain index $l_{sym}$ may correspond to an OFDM symbol index $l_{sym}$.

Figure 3:
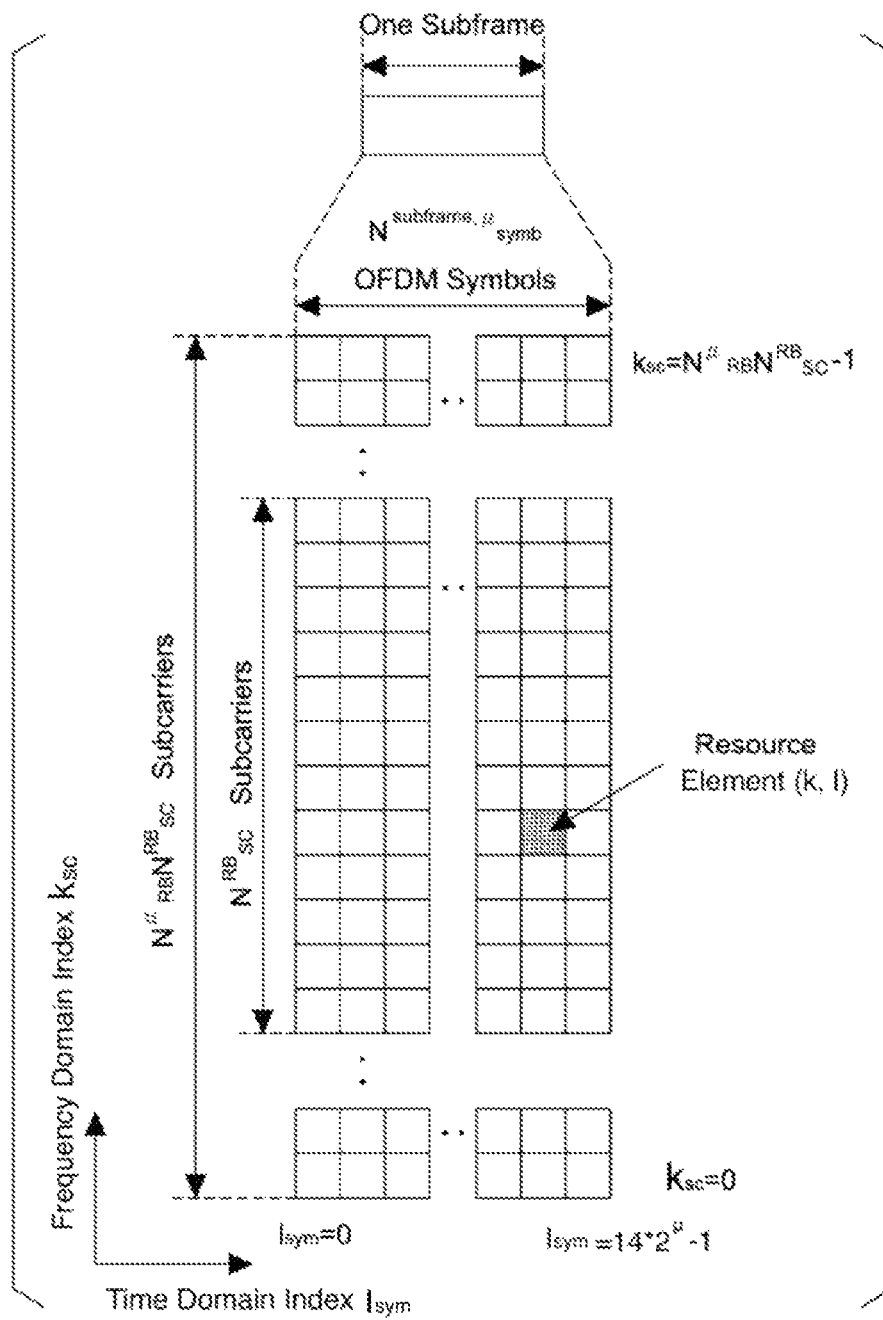
FIG. 3 is a schematic diagram showing an example of a resource grid in a subframe according to one aspect of the present embodiment.

FIG. 3 is a schematic diagram showing an example of a resource grid in a subframe according to one aspect of the present embodiment. In the resource grid of FIG. 3, a horizontal axis is a time domain index $l_{sym}$, and a vertical axis is a frequency domain index $k_{sc}$. In one subframe, the frequency domain of the resource grid includes $N^{\mu}_{RB} N^{RB}_{SC}$ subcarriers. In one subframe, the time domain of the resource grid may include $14 \cdot 2^{\mu}$ OFDM symbols. One resource block includes $N^{RB}_{SC}$ subcarriers. The time domain of the resource block may correspond to one OFDM symbol. The time domain of the resource block may also correspond to fourteen OFDM symbols. The time domain of the resource block may correspond to one or more time slots. The time domain of the resource block may also correspond to one subframe.

The frequency domain of the resource grid including $N^{\mu}_{RB} N^{RB}_{SC}$ subcarriers may correspond to the frequency domain of the resource grid including $N^{\mu}_{RB}$ resource blocks.

The terminal apparatus 1 may be indicated to perform transmission/reception using only a subset of the resource grid. The subset of a resource grid is also referred to as a BWP and may be given based on at least some or all of higher layer parameters and/or Downlink Control Information (DCI). The BWP is also referred to as a carrier bandwidth part. The BWP is also referred to as a BandWidth Part. The terminal apparatus 1 may not be indicated to perform transmission and/or reception using all sets of the resource grids. The terminal apparatus 1 may be indicated to perform transmission/reception using some frequency resources within the resource grid. One BWP may include a plurality of resource blocks in the frequency domain. One BWP may include a plurality of consecutive resource blocks in the frequency domain. The BWP configured for a downlink carrier is also referred to as a downlink BWP. The BWP configured for an uplink carrier is also referred to as an uplink BWP. The BWP may also be a subset of a carrier frequency band.

One or more downlink BWPs may be configured for each of serving cells. One or more uplink BWPs may be configured for each of serving cells.

One downlink BWP of the one or more downlink BWPs configured for a serving cell may be configured (or activated) as an active downlink BWP. A downlink BWP switch is used to deactivate one active downlink BWP and activate an inactive downlink BWP other than the one active downlink BWP. The downlink BWP switch may be controlled by a BWP field included in downlink control information. The downlink BWP switch may also be controlled based on a higher layer parameter.

DL-SCH may be received in an active downlink BWP. A Physical Downlink Control Channel (PDCCH) may be monitored in an active downlink BWP. A Physical Downlink Shared Channel (PDSCH) may be received in an active downlink BWP. Some or all of a PDSCH, a PDCCH, and a Channel State information Reference Signal (CSI-RS) may not be received outside of an active downlink BWP.

A Downlink-Shared CHannel (DL-SCH) may not be received in an inactive downlink BWP. A PDCCH may not be monitored in an inactive downlink BWP. Channel State Information (CSI) for an inactive downlink BWP may not be reported.

Two or more downlink BWPs of the one or more downlink BWPs configured for a serving cell may not be configured as active downlink BWPs. At a certain time, one downlink BWP is active.

One uplink BWP of the one or more uplink BWPs configured for a serving cell may be configured (or activated) as an active uplink BWP. An uplink BWP switch is used to deactivate one active uplink BWP and activate an inactive uplink BWP other than the one active uplink BWP.

The uplink BWP switch may be controlled by a BWP field included in downlink control information. The uplink BWP switch may also be controlled based on a higher layer parameter.

An Uplink-Shared CHannel (UL-SCH) may be transmitted in an active uplink BWP.

A PUCCH may be transmitted in an active uplink BWP. A Physical Random Access CHannel (PRACH) may be transmitted in an active uplink BWP. A Sounding Reference Signal (SRS) may be transmitted in an active uplink BWP. Some or all of a Physical Uplink Shared CHannel (PUSCH) and a PUCCH may not be transmitted outside of an active uplink BWP.

An Uplink-Shared CHannel (UL-SCH) is not transmitted in an inactive uplink BWP. A PUCCH is not transmitted in an in active uplink BWP. A PRACH is not transmitted in an inactive uplink BWP. An SRS is not transmitted in an inactive uplink BWP.

Two or more uplink BWPs of the one or more uplink BWPs configured for a serving cell may not be configured as active uplink BWPs. At a certain time, one uplink BWP may be active.

The higher layer parameter is a parameter included in a higher layer signal. The higher layer signal may be RRC (Radio Resource Control) signaling or a MAC CE (Medium Access Control Control Element). Here, the higher layer signal may be an RRC layer signal or may be a MAC layer signal.

The higher layer signal may be common RRC signaling. The common RRC signaling may include at least some or all of the following features C1 to C3.

Feature C1) being mapped to a Broadcast Control CHannel (BCCH) logical channel or a Common Control CHannel (CCCH) logical channel Feature C2) including at least a ReconfigrationWithSync information element Feature C3) being mapped to a Physical Broadcast Channel (PBCH) and/or system information The ReconfigrationWithSync information element may include information indicating a configuration commonly used in the serving cell. The configuration commonly used in the serving cell may include at least a PRACH configuration. The PRACH configuration may indicate at least one or more random access preamble indexes. The PRACH configuration may indicate at least a PRACH time/frequency resource.

The common RRC signaling may include at least a common RRC parameter. The common RRC parameter may also be a cell-specific parameter that is commonly used in the serving cell.

The higher layer signal may be dedicated RRC signaling. The dedicated RRC signaling may include at least some or all of the following features D1 to D2.

Feature D1) being mapped to a Dedicated Control CHannel (DCCH) logical channel

Feature D2) not including at least a ReconfigrationWithSync information element

For example, an MIB (Master Information Block) and an SIB (System Information Block) may be common RRC signaling. In addition, a higher layer message that is mapped to the DCCH logical channel and includes at least the ReconfigurationWithSync information element may be common RRC signaling. In addition, a higher layer message that is mapped to the DCCH logical channel and does not include the ReconfigurationWithSync information element may be included in the dedicated RRC signaling.

The SIB may at least indicate a time index of an SS (Synchronization Signal) block. The SS block is also referred to as an SS/PBCH block. The SIB may include at least information related to a PRACH resource. The SIB may include at least information related to an initial connection configuration.

The ReconfigrationWithSync information element may include at least information related to a PRACH resource (or a RACH resource). The ReconfigurationWithSync information element may include at least information related to a random access configuration.

The dedicated RRC signaling may include at least a dedicated RRC parameter. The dedicated RRC parameter may be a UE-specific parameter dedicated to the terminal apparatus 1.

The common RRC parameter and the dedicated RRC parameter are referred to as higher layer parameters.

A physical channel and a physical signal according to various aspects of the present embodiment will be described below.

One physical channel may be mapped to one serving cell. One physical channel may be mapped to one carrier band part configured for one carrier included one a serving cell.

An uplink physical channel may correspond to a set of resource elements that transmit information generated in a higher layer. The uplink physical channel may be a physical channel used in an uplink carrier. In a wireless communication system according to one aspect of the present embodiment, at least some or all of the following uplink physical channels may be used.

PUCCH (Physical Uplink Control CHannel)
PUSCH (Physical Uplink Shared CHannel)
PRACH (Physical Random Access CHannel)

The PUCCH may be used to transmit uplink control information (UCI). The uplink control information includes some or all of Channel State Information (CSI), a Scheduling Request (SR), and a Hybrid Automatic Repeat request ACKnowledgement (HARQ-ACK) information.

The uplink control information may be multiplexed on the PUCCH. The multiplexed PUCCH may be transmitted.

The uplink control information may be mapped to the PUCCH.

The HARQ-ACK information may include at least a HARQ-ACK bit corresponding to a transport block (Transport Block (TB), Medium Access Control Protocol Data Unit (MAC PDU), Downlink-Shared Channel (DL-SCH), Uplink-Shared Channel (UL-SCH), or Physical Downlink Shared Channel (PDSCH)). The HARQ-ACK bit may indicate an ACK (acknowledgement) or a NACK (negative-acknowledgement) corresponding to the transport block. The ACK may be a value indicating that decoding of the transport block is successfully completed. The NACK may be a value indicating that decoding of the transport block is not successfully completed. The HARQ-ACK information may correspond to a HARQ-ACK codebook that includes one or more HARQ-ACK bits. The fact that the HARQ-ACK bit corresponds to one or more transport blocks may mean that the HARQ-ACK bit corresponds to a PDSCH including the one or more transport blocks.

The HARQ-ACK bit may indicate an ACK or a NACK corresponding to one CBG (Code Block Group) included in the transport block. The HARQ-ACK information is also referred to as a HARQ-ACK, a HARQ feedback, HARQ information, HARQ control information, and a HARQ-ACK message.

A scheduling request (SR) may be at least used to request a PUSCH (or UL-SCH) resource for initial transmission (or new transmission). A scheduling request bit may be used to indicate either a positive SR or a negative SR. The fact that the scheduling request bit indicates a positive SR is also referred to as "transmitting a positive SR". The positive SR may indicate that a PUSCH resource for initial transmission is requested by the terminal apparatus 1. The positive SR may indicate that a scheduling request is triggered by a higher layer. The positive SR may be transmitted in a case that a scheduling request is instructed by a higher layer to be transmitted. The fact that the scheduling request bit indicates a negative SR is also referred to as "transmitting a negative SR". The negative SR may indicate that a PUSCH resource for initial transmission is not requested by the terminal apparatus 1. The negative SR may indicate that a scheduling request is not triggered by a higher layer. The negative SR may be transmitted in a case that a scheduling request is not instructed by a higher layer to be transmitted.

The scheduling request bit may be used to indicate either a positive SR or a negative SR for any one or more SR configurations. Each of the one or more SR configurations may correspond to one or more logical channels, respectively. A positive SR for a certain SR configuration may be a positive SR for any or all of the one or more logical channels corresponding to the certain SR configuration. A negative SR may not correspond to a specific SR configuration. Indicating a negative SR may mean indicating a negative SR for all SR configurations.

The SR configuration may be a scheduling request ID. The scheduling request ID may be given by a higher layer parameter.

The channel state information may include at least some or all of a Channel Quality Indicator (CQI), a Precoder Matrix Indicator (PMI), and a Rank Indicator (RI). The CQI is an indicator related to channel quality (for example, propagation strength), and the PMI is an indicator related to a precoder. The RI is an indicator related to a transmission rank (or the number of transmission layers).

The channel state information may be given at least based on receiving a physical signal (e.g., CSI-RS) that is at least used for channel measurement. The channel state information may include a value selected by the terminal apparatus 1. The channel state information may be selected by the terminal apparatus 1 at least based on receiving a physical signal that is at least used for channel measurement. The channel measurement includes interference measurement.

A channel state information report is a report of the channel state information. The channel state information report may include a CSI part 1 and/or a CSI part 2. The CSI part 1 may be configured to include at least some or all of wideband channel quality information (wideband CQI), a wideband precoder matrix indicator (wideband PMI), and a rank indicator. The number of bits of the CSI part 1 multiplexed on the PUCCH may be a predetermined value regardless of a value of the rank indicator of the channel state information report. The number of bits of the CSI part 2 multiplexed on the PUCCH may be given at least based on the value of the rank indicator of the channel state information report. The rank indicator of the channel state information report may be a value of the rank indicator used to calculate the channel state information report. The rank indicator of the channel state information may be a value indicated by a rank indicator field included in the channel state information report.

A set of rank indicators permitted in the channel state information report may be some or all of 1 to 8. The set of rank indicators permitted in the channel state information report may be given at least based on a higher layer parameter RankRestriction. In a case that the set of rank indicators permitted in the channel state information report includes only one value, the rank indicator of the channel state information report may be the one value.

A priority may be configured for the channel state information report. The priority of the channel state information report may be given at least based on some or all of a configuration related to a time domain behavior of the channel state information report, a type of content of the channel state information report, an index of the channel state information report, and/or an index of a serving cell configured with measurement of the channel state information report.

The configuration related to the time domain behavior of the channel state information report may be a configuration indicating whether the channel state information report is performed aperiodically, semi-persistently, or semi-statically.

The type of content of the channel state information report may indicate whether the channel state information report includes a Reference Signals Received Power (RSRP) of a layer 1.

The index of the channel state information report may be given by a higher layer parameter.

The PUCCH supports PUCCH formats (PUCCH format 0 to PUCCH format 4). The PUCCH format may be transmitted on the PUCCH. The fact that a PUCCH format is transmitted may mean that a PUCCH is transmitted.

FIG. 4 is a schematic diagram showing an example of a relationship between a PUCCH format and the length $N^{PUCCH}_{Symb}$ of the PUCCH format according to one aspect of the present embodiment. The length $N^{PUCCH}_{Symb}$ of PUCCH format 0 is 1 or 2 OFDM symbols. The length N $PUCCH_{Symb}$ of PUCCH format 1 is any of 4 to 14 OFDM symbols. The length $N^{PUCCH}_{Symb}$ of PUCCH format 2 is 1 or 2 OFDM symbols. The length $N^{PUCCH}_{Symb}$ of PUCCH format 3 is any of 4 to 14 OFDM symbols. The length $N^{PUCCH}_{Symb}$ of PUCCH format 4 is any of 4 to 14 OFDM symbols.

The PUSCH is at least used to transmit the transport block. The PUSCH may be used to transmit at least some or all of the transport block, the HARQ-ACK information, the channel state information, and the scheduling request. The PUSCH is at least used to transmit a random access message 3.

The UL-SCH may be mapped to the PUSCH. The uplink control information may be mapped to the PUSCH.

The PRACH may be at least used to transmit a random access preamble (message 1). The PRACH may be at least used to indicate some or all of an initial connection establishment procedure, a handover procedure, a connection re-establishment procedure, synchronization (timing adjustment) for PUSCH transmission, and a request for the PUSCH (or UL-SCH) resource. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

An uplink physical signal may correspond to a set of resource elements. The uplink physical signal may not transmit information generated in a higher layer. The uplink physical signal may be a physical signal used in an uplink carrier. In a wireless communication system according to one aspect of the present embodiment, at least some or all of the following uplink physical signals may be used.

UL DMRS (UpLink Demodulation Reference Signal)
SRS (Sounding Reference Signal)
UL PTRS (UpLink Phase Tracking Reference Signal)

The UL DMRS is associated with transmission of a PUSCH and/or a PUCCH. The UL DMRS is multiplexed with the PUSCH or the PUCCH. The base station apparatus 3 may use the UL DMRS to perform propagation path compensation of the PUSCH or the PUCCH. Hereinafter, transmission of both a PUSCH and a UL DMRS associated with the PUSCH will be referred to simply as transmission of a PUSCH. Hereinafter, transmission of both a PUCCH and a UL DMRS associated with the PUCCH will be referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The association between the UL DMRS and the PUSCH may mean that the UL DMRS and the PUSCH are transmitted on the same antenna port. The association between the UL DMRS and the PUSCH may mean that the precoder of the UL DMRS is the same as the precoder of the PUSCH.

The SRS may be transmitted at the end of a subframe in an uplink slot or in a predetermined number of OFDM symbols from the end.

The UL PTRS may be a reference signal that is at least used for phase tracking.

A downlink physical channel may correspond to a set of resource elements that transmit information generated in a higher layer. The downlink physical channel may be a physical channel used in a downlink carrier. In a wireless communication system according to one aspect of the present embodiment, at least some or all of the following downlink physical channels may be used.

PBCH (Physical Broadcast Channel)
PDCCH (Physical Downlink Control Channel)
PDSCH (Physical Downlink Shared Channel)

The PBCH is at least used to transmit an MIB and/or a PBCH payload. The PBCH payload may at least include information indicating an index related to transmission timing of an SS block. The PBCH payload may include information associated with an identifier (index) of the SS block. The PBCH may be transmitted based on a predetermined transmission interval. The PBCH may be transmitted at an interval of 80 ms. The PBCH may be transmitted at an interval of 160 ms. The content of information included in the PBCH may be updated every 80 ms. Some or all of the contents of information included in the PBCH may be updated every 160 ms. The PBCH may include 288 subcarriers. The PBCH may include 2, 3, or 4 OFDM symbols. The MIB may include information related to an identifier (index) of the SS block. The MIB may include information indicating at least some of a slot number, a subframe number, and/or a radio frame number in which the PBCH is transmitted.

A BCH may be mapped to the PBCH.

The PDCCH may be at least used to transmit downlink control information (DCI). The PDCCH may be transmitted with at least Downlink Control Information (DCI) included therein. The downlink control information is also referred to as a DCI format. The downlink control information may at least indicate either a downlink assignment or an uplink grant. The DCI format used for PDSCH scheduling is also referred to as a downlink DCI format. The DCI format used for PUSCH scheduling is also referred to as an uplink DCI format. The uplink DCI format at least includes one or both of DCI format 0_0 and DCI format 0_1. The terminal apparatus 1 may monitor a set of PDCCH candidates in one or more control resource sets (CORESETs).

The downlink control information may be mapped to the PDCCH.

The DCI format 0_0 at least includes some or all of 1A to 1E.

1A) DCI format identification field (Identifier for DCI formats field)
1B) Frequency domain resource assignment field
1C) Uplink time domain resource assignment field
1D) Frequency hopping flag field
1E) MCS field (Modulation and Coding Scheme field)

The DCI format identification field may indicate whether a DCI format including the DCI format identification field is an uplink DCI format or a downlink DCI format. The DCI format identification field included in the DCI format 0_0 may indicate 0 (or may indicate an uplink DCI format).

The frequency domain resource assignment field may be at least used to indicate the assignment of frequency resources for the PUSCH (or PDSCH).

The uplink time domain resource assignment field may be at least used to indicate the assignment of time resources for the PUSCH (or PDSCH).

The frequency hopping flag field may be at least used to indicate whether frequency hopping is applied to the PUSCH.

The MCS field may be at least used to indicate some or all of a modulation scheme and/or a target coding rate for the PUSCH (or PDSCH). The target coding rate may be a target coding rate for the transport block of the PUSCH. A transport block size (TBS) may be given at least based on the target coding rate.

The DCI format 0_0 may not include a field used for a CSI request.

The DCI format 0_1 includes at least some or all of 2A to 2H.
- 2A) DCI format identification field
- 2B) Frequency domain resource assignment field
- 2C) Uplink time domain resource assignment field
- 2D) Frequency hopping flag field
- 2E) MCS field
- 2F) CSI request field (Second CSI request field)
- 2G) BWP field
- 2H) UL DAI field (Uplink Downlink Assignment Indicator field)

The DCI format identification field included in the DCI format 0_1 may indicate 0.

The BWP field may be used to indicate an uplink BWP to which the PUSCH is mapped. The BWP field may be used to indicate a downlink BWP to which the PDSCH is mapped.

The CSI request field is at least used to indicate a CSI report. A size of the second CSI request field may be given at least based on a higher layer parameter ReportTriggerSize.

The UL DAI field may be at least used to generate a codebook of HARQ-ACK information. V UL DAI may be given at least based on a value of the UL DAI field. The V UL DAI is also referred to as a UL DAI.

The downlink DCI format at least includes one or both of DCI format 1_0 and DCI format 1_1.

The DCI format 1_0 includes at least some or all of 3A to 3I.
- 3A) DCI format identification field (Identifier for DCI formats field)
- 3B) Frequency domain resource assignment field
- 3C) Downlink time domain resource assignment field
- 3D) Frequency hopping flag field
- 3E) MCS field (Modulation and Coding Scheme field)
- 3F) First CSI request field
- 3G) PDSCH-to-HARQ feedback timing indicator field
- 3H) PUCCH resource indicator field
- 3I) Counter DAI field (Counter Downlink Assignment Indicator field)

The DCI format identification field included in the DCI format 1_0 may indicate 1 (or may indicate a downlink DCI format).

The downlink time domain resource assignment field may be used to indicate at least some or all of a timing K0, a DMRS mapping type, an OFDM symbol to which the PDSCH is mapped. When the index of a slot including the PDCCH is slot n, the index of a slot including the PDSCH may be n+K0.

The PDSCH-to-HARQ feedback timing indicator field may be a field indicating a timing K1. In a case that the index of a slot including the last OFDM symbol of the PDSCH is a slot n, the index of a slot including the PUCCH or PUSCH including at least the HARQ-ACK corresponding to a transport block included in the PDSCH may be n+K1. In a case that the index of the slot including the last OFDM symbol of the PDSCH is a slot n, an index of a slot including a first OFDM symbol of the PUCCH or a first OFDM symbol of the PUSCH including at least the HARQ-ACK corresponding to a transport block included in the PDSCH may be n+K1.

The PUCCH resource indicator field may be a field indicating an index of either one or a plurality of PUCCH resources included in a PUCCH resource set.

The counter DAI field may be at least used to generate a codebook of HARQ-ACK information. $V^{DL}_{C-DAI,c,m}$ may be given at least based on a value of the counter DAI field. The $V^{DL}_{C-DAI,c,m}$ is also referred to as a counter DAI.

The DCI format 1_1 includes at least some or all of 4A to 4I.
- 4A) DCI format identification field (Identifier for DCI formats field)
- 4B) Frequency domain resource assignment field
- 4C) Downlink time domain resource assignment field
- 4D) Frequency hopping flag field
- 4E) MCS field (Modulation and Coding Scheme field)
- 4F) PDSCH-to-HARQ feedback timing indicator field
- 4G) PUCCH resource indicator field
- 4H) BWP field
- 4I) DAI field (Downlink Assignment Indicator field)

The DCI format identification field included in the DCI format 1_1 may indicate 1 (or may indicate a downlink DCI format).

The DAI field may be at least used to generate a codebook of HARQ-ACK information. $V^{DL}_{T-DAI,m}$ may be given at least based on a value of the DAI field. The $V^{DL}_{C-DAI,c,m}$ may be given at least based on a value of the DAI field. The $V^{DL}_{T-DAI,m}$ is also referred to as a total DAI.

DCI format 2_0 may be at least used to indicate a slot format. The slot format may be information indicating a transmission direction (downlink, uplink, or XXX) for each of OFDM symbols constituting a slot. XXX may not indicate the transmission direction.

The control resource set may indicate a time domain and/or a frequency domain to which one or more PDCCHs are mapped. The control resource set may be a domain in which the terminal apparatus 1 monitors the PDCCH. The control resource set may include consecutive resources (or localized resources). The control resource set may include non-consecutive resources (or distributed resources).

Some or all of the index of the control resource set, the number of OFDM symbols of the control resource set, and the set of resource blocks of the control resource set may be given for each control resource set.

The index of the control resource set may be at least used to identify the control resource set.

The number of OFDM symbols of the control resource set may indicate the number of OFDM symbols to which the control resource set is mapped.

The set of resource blocks of the control resource set may indicate a set of resource blocks to which the control resource set is mapped. The set of resource blocks of the control resource set may be given by a bitmap included in a higher layer parameter. The bits included in the bitmap may correspond to six consecutive resource blocks.

A set of PDCCH candidates monitored by the terminal apparatus 1 may be defined in terms of a search space set. In other words, the set of PDCCH candidates monitored by the terminal apparatus 1 may be given by the search space set.

A search space may include one or more PDCCH candidates at a certain aggregation level. The aggregation level of the PDCCH candidate may indicate the number of CCEs that constitute the PDCCH.

The search space set may include at least one or more search spaces. The search space set may include one or more PDCCH candidates corresponding to each of one or more aggregation levels. The search space set may be any one of a type 0 PDCCH common search space set, a type 0a PDCCH common search space set, a type 1 PDCCH common search space set, a type 2 PDCCH common search space set, a type 3 PDCCH common search space set, and/or a UE-specific PDCCH search space set.

The type 0 PDCCH common search space set, the type 0a PDCCH common search space set, the type 1 PDCCH common search space set, the type 2 PDCCH common search space set, and the type 3 PDCCH common search space set are also referred to as a CSS set (Common Search Space set). The UE-specific PDCCH search space set is also referred to as a USS set (UE specific Search Space set).

Each of search space sets may be associated with a control resource set. Each of search space sets may be at least included in a control resource set. An index of the control resource set associated with a search space set may be given for each of the search space sets.

A monitoring periodicity of the search space set may be configured for each of the search space sets. The monitoring periodicity of the search space set may at least indicate an interval of slots in which the search space set is monitored by the terminal apparatus 1. A higher layer parameter indicating at least the monitoring periodicity of the search space set may be given for each search space set.

A monitoring offset of the search space set may be configured for each of the search space sets. The monitoring offset of the search space set may at least indicate an offset from a reference index (e.g., slot #0) of an index of the slot in which the search space set is monitored by the terminal apparatus 1. A higher layer parameter indicating at least the monitoring offset of the search space set may be given for each search space set.

A monitoring pattern of the search space set may be configured for each of the search space sets. The monitoring pattern of the search space set may indicate a first OFDM symbol for the search space set in which the monitoring is performed. The monitoring pattern of the search space set may be given by a bitmap indicating the first OFDM symbol in one or more slots. A higher layer parameter indicating at least the monitoring pattern of the search space set may be given for each search space set.

A monitoring occasion for the search space set may be given at least based on some or all of the monitoring periodicity of the search space set, the monitoring offset of the search space set, the monitoring pattern of the search space set, and/or a DRX configuration.

Figure 5:
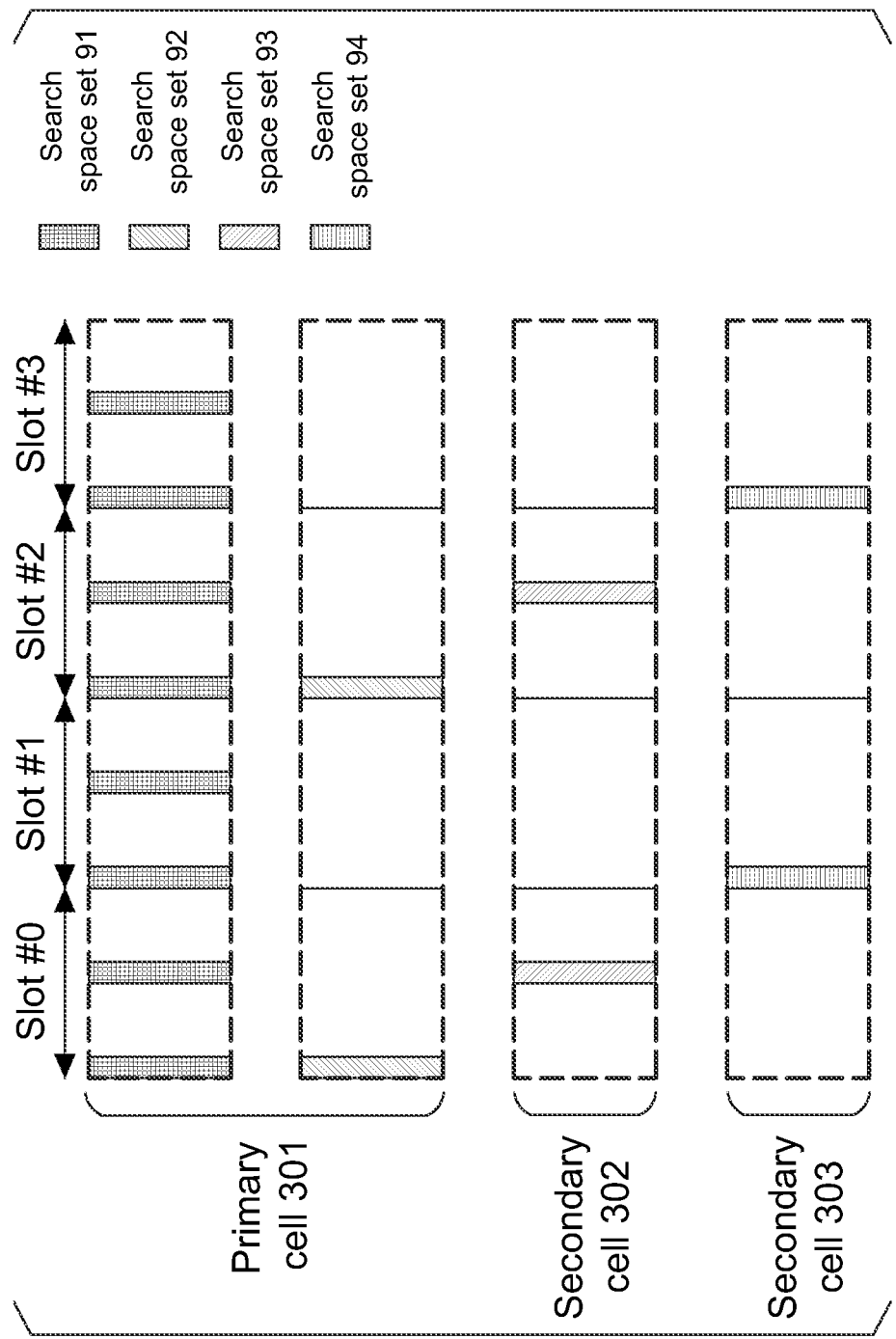
FIG. 5 is a diagram showing an example of a monitoring occasion of a search space set according to one aspect of the present embodiment.

FIG. 5 is a diagram showing an example of a monitoring occasion of a search space set according to one aspect of the present embodiment. In FIG. 5, search space set 91 and search space set 92 are configured in a primary cell 301, search space set 93 is configured in a secondary cell 302, and search space set 94 is configured in a secondary cell 303.

In FIG. 5, blocks indicated by grid lines indicate the search space set 91, blocks indicated by upper-right diagonal lines indicate the search space set 92, blocks indicated by upper-left diagonal lines indicate the search space set 93, and blocks indicated by horizontal lines indicate the search space set 94.

The monitoring periodicity of the search space set 91 is set to one slot, the monitoring offset of the search space set 91 is set to zero slots, and the monitoring pattern of the search space set 91 is set to [1,0,0,0,0,0,0,1,0,0,0,0,0,0]. In other words, the monitoring occasions for the search space set 91 are the first OFDM symbol (OFDM symbol #0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1,0,0,0,0,0,0,0,0,0,0,0,0,0]. In other words, the monitoring occasion for the search space set 92 is the first OFDM symbol (OFDM symbol #0) in each even-numbered slot.

The monitoring periodicity of the search space set 93 is set to two slots, the monitoring offset of the search space set 93 is set to zero slots, and the monitoring pattern of the search space set 93 is set to [0,0,0,0,0,0,0,1,0,0,0,0,0,0]. In other words, the monitoring occasion for the search space set 93 is the eighth OFDM symbol (OFDM symbol #7) in each even-numbered slot.

The monitoring periodicity of the search space set 94 is set to two slots, the monitoring offset of the search space set 94 is set to one slot, and the monitoring pattern of the search space set 94 is set to [1,0,0,0,0,0,0,0,0,0,0,0,0,0]. In other words, the monitoring occasion for the search space set 94 is the first OFDM symbol (OFDM symbol #0) in each odd-numbered slot.

The type 0 PDCCH common search space set may be at least used for the DCI format with a CRC (Cyclic Redundancy Check) sequence scrambled by a SI-RNTI (System Information-Radio Network Temporary Identifier). The configuration of the type 0 PDCCH common search space set may be given at least based on four bits of the LSBs (Last Significant Bits) of a higher layer parameter PDCCH-ConfigSIB1. The higher layer parameter PDCCH-ConfigSIB1 may be included in an MIB. The configuration of the type 0 PDCCH common search space set may be given at least based on a higher layer parameter SearchSpaceZero. The interpretation of bits of the higher layer parameter SearchSpaceZero may be the same as the interpretation of four bits of the LSBs of the higher layer parameter PDCCH-ConfigSIB1. The configuration of the type 0 PDCCH common search space set may be given at least based on a higher layer parameter SearchSpaceSIB1. The higher layer parameter SearchSpaceSIB1 may be included in a higher layer parameter PDCCH-ConfigCommon. The PDCCH detected in the type 0 PDCCH common search space set may be at least used for scheduling a PDSCH transmitted with an SIB1 included. The SIB1 is a type of SIB. The SIB1 may include scheduling information for an SIB other than the SIB1. The terminal apparatus 1 may receive the higher layer parameter PDCCH-ConfigCommon in the EUTRA. The terminal apparatus 1 may receive the higher layer parameter PDCCH-ConfigCommon in the MCG.

The type 0a PDCCH common search space set may be at least used for the DCI format with a CRC (Cyclic Redundancy Check) sequence scrambled by a SI-RNTI (System Information-Radio Network Temporary Identifier). The configuration of the type 0a PDCCH common search space set may be given at least based on a higher layer parameter SearchSpaceOtherSystemInformation. The higher layer parameter SearchSpaceOtherSystemnformation may be included in the SIB1. The higher layer parameter SearchSpaceOtherSystemnformation may be included in the higher layer parameter PDCCH-ConfigCommon. The PDCCH detected in the type 0 PDCCH common search space set may be at least used for scheduling a PDSCH transmitted with an SIB included other than the SIB1.

The type 1 PDCCH common search space set may be at least used for the DCI format with a CRC sequence scrambled by a RA-RNTI (Random Access-Radio Network Temporary Identifier) and/or with a CRC sequence scrambled by a TC-RNTI (Temporary Common-Radio Network Temporary Identifier). The RA-RNTI may be given at least based on the time/frequency resource of a random access preamble transmitted by the terminal apparatus 1. The TC-RNTI may be given by a PDSCH that is scheduled in the DCI format with a CRC sequence scrambled by the RA-RNTI (also referred to as a message 2 or a random access response). The configuration of the type 1 PDCCH common search space set may be given at least based on a higher layer parameter ra-SearchSpace. The higher layer parameter ra-SearchSpace may be included in the SIB1. The higher layer parameter ra-SearchSpace may be included in the higher layer parameter PDCCH-ConfigCommon.

The type 2 PDCCH common search space set may be at least used for the DCI format with a CRC sequence scrambled by a P-RNTI (Paging-Radio Network Temporary Identifier). The P-RNTI may be at least used for the transmission of the DCI format including information notifying the change of an SIB. The configuration of the type 2 PDCCH common search space set may be given at least based on a higher layer parameter PagingSearchSpace. The higher layer parameter PagingSearchSpace may be included in the SIB1. The higher layer parameter PagingSearchSpace may be included in the higher layer parameter PDCCH-ConfigCommon.

The type 3 PDCCH common search space set may be at least used for the DCI format with a CRC sequence scrambled by a C-RNTI (Cell-Radio Network Temporary Identifier). The C-RNTI may be given at least based on a PDSCH that is scheduled in the DCI format with the CRC sequence scrambled by the TC-RNTI (also referred to as a message 4 or a contention resolution). The type 3 PDCCH common search space set may be a search space set given in a case that a higher layer parameter SearchSpaceType is set as common.

The UE-specific PDCCH search space set may be at least used for the DCI format with a CRC sequence scrambled by a C-RNTI.

When a C-RNTI is given to the terminal apparatus 1, the type 0 PDCCH common search space set, the type 0a PDCCH common search space set, the type 1 PDCCH common search space set, and/or the type 2 PDCCH common search space set may be at least used for the DCI format with a CRC sequence scrambled by the C-RNTI.

When a C-RNTI is given to the terminal apparatus 1, a search space set given at least based on any one of the higher layer parameter PDCCH-ConfigSIB, the higher layer parameter SearchSpaceZero, the higher layer parameter SearchSpaceSIB1, the higher layer parameter SearchSpaceOtherSystemInformation, the higher layer parameter ra-SearchSpace or the higher layer parameter PagingSearchSpace may be at least used for the DCI format with a CRC sequence scrambled with the C RNTI.

The common control resource set may include at least one or both of the CSS and the USS. The dedicated control resource set may include at least one or both of the CSS and the USS.

A physical resource of the search space set includes a control channel element (CCE). The CCE includes six resource element groups (REGs). The REG may include one OFDM symbol in one physical resource block (PRB). In other words, the REG may include 12 resource elements (REs). The PRB is also simply referred to as a resource block (RB).

The PDSCH is at least used to transmit a transport block. The PDSCH may be at least used to transmit a random access message 2 (Random Access Response). The PDSCH may be at least used to transmit system information including a parameter used for an initial access.

The DL-SCH may be mapped to the PDSCH.

A downlink physical signal may correspond to a set of resource elements. The downlink physical signal may not transmit information generated in a higher layer. The downlink physical signal may be a physical signal used in a downlink carrier. In a wireless communication system according to one aspect of the present embodiment, at least some or all of the following downlink physical signals may be used.

SS (Synchronization signal)
DL DMRS (DownLink DeModulation Reference Signal)
CSI-RS (Channel State information Reference Signal)
DL PTRS (DownLink Phase Tracking Reference Signal)
TRS (Tracking Reference Signal)

The synchronization signal is used for the terminal apparatus 1 to establish synchronization in a frequency domain and/or a time domain in the downlink. The synchronization signal includes a PSS (Primary Synchronization Signal) and an SSS (Secondary Synchronization Signal).

An SS block (SS/PBCH block) includes at least some or all of the PSS, the SSS, and the PBCH. Respective antenna ports of some or all of the PSS, the SSS, and the PBCH included in the SS block may be the same. Some or all of the PSS, the SSS, and the PBCH included in the SS block may be mapped to consecutive OFDM symbols. Respective CP configurations of some or all of the PSS, the SSS, and the PBCH included in the SS block may be the same. Respective subcarrier spacing configurations $\mu$ of some or all of the PSS, the SSS, and the PBCH included in the SS block may be the same.

The DL DMRS is associated with transmission of the PBCH, the PDCCH and/or the PDSCH. The DL DMRS is multiplexed with the PBCH, the PDCCH and/or the PDSCH. The terminal apparatuses 1 may use the DL DMRS corresponding to the PBCH, the PDCCH, or the PDSCH to perform propagation path compensation of the PBCH, the PDCCH or the PDSCH. Hereinafter, transmission of both of a PBCH and a DL DMRS associated with the PBCH is referred to as transmission of a PBCH. In addition, transmission of both of a PDCCH and a DL DMRS associated with the PDCCH is simply referred to as transmission of a PDCCH. Transmission of both of a PDSCH and a DL DMRS associated with the PDSCH is simply referred to as transmission of a PDSCH. The DL DMRS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH.

The CSI-RS may be a signal that is at least used to calculate channel state information. A pattern of the CSI-RS assumed by the terminal apparatus may be given at least by a higher layer parameter.

The PTRS may be a signal that is at least used to compensate for phase noise. A pattern of the PTRS assumed by the terminal apparatus may be given at least based on a higher layer parameter and/or DCI.

The DL PTRS may be associated with a DL DMRS group that includes at least an antenna port used for one or more DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port with the smallest index for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

The downlink physical channels and the downlink physical signals are also referred to downlink signals. The uplink physical channels and the uplink physical signals are also referred to uplink signals. The downlink signals and the uplink signals are collectively referred to as physical signals. The downlink signals and the uplink signals are collectively referred to as signals. The downlink physical channels and the uplink physical channels are collectively referred to as physical channels. The downlink physical signals and the uplink physical signals are collectively referred to as physical signals.

The SS/PBCH block will be described.

The SS/PBCH block may include at least some or all of the PSS, the SSS, and the PBCH. The SS/PBCH block may include four consecutive OFDM symbols. In the time domain, the PSS may be mapped to the first OFDM symbol of the SS/PBCH block. In the time domain, the SSS may be mapped to the third OFDM symbol of the SS/PBCH block. In the time domain, the PBCH may be mapped to the second OFDM symbol, the third OFDM symbol, and the fourth OFDM symbol of the SS/PBCH block.

The SS/PBCH block may include 240 subcarriers. In the frequency domain, the 57th to 183rd subcarriers are mapped. In the frequency domain, the SSS may be mapped to the 57th to 183rd subcarriers. The first subcarrier of the first OFDM symbol to the 56th subcarrier of the first OFDM symbol may be set to zero. The 184th subcarrier of the first OFDM symbol to the 240th subcarrier of the first OFDM symbol may be set to zero. The 49th subcarrier of the third OFDM symbol to the 56th subcarrier of the third OFDM symbol may be set to zero. The 184th subcarrier of the third OFDM symbol to the 192nd subcarrier of the third OFDM symbol may be set to zero. The PBCH may be mapped to subcarriers from the first subcarrier to the 240th subcarrier of the second OFDM symbol that are not mapped with a DMRS associated with the PBCH. The PBCH may be mapped to subcarriers from the first subcarrier to the 48th subcarrier of the third OFDM symbol that are not mapped with a DMRS associated with the PBCH. The PBCH may be mapped to subcarriers from the 193rd subcarrier to the 240th subcarrier of the third OFDM symbol that are not mapped with a DMRS associated with the PBCH. The PBCH may be mapped to subcarriers from the first subcarrier to the 240th subcarrier of the fourth OFDM symbol that are not mapped with a DMRS associated with the PBCH.

BCH (Broadcast CHannel), UL-SCH (Uplink-Shared CHannel), and DL-SCH (Downlink-Shared CHannel) are transport channels. A channel used in a Medium Access Control (MAC) layer is referred to as a transport channel A unit of the transport channel used in the MAC layer is also referred to as a transport block (TB) or a MAC PDU. HARQ (Hybrid Automatic Repeat reQuest) control is performed for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) higher layer signals with each other in higher layers. For example, the base station apparatus 3 and the terminal apparatus 1 may transmit and/or receive RRC (Radio Resource Control) signaling (RRC message or RRC information) in the RRC layer, respectively. In addition, the base station apparatus 3 and the terminal apparatus 1 may transmit and/or receive a MAC CE (Control Element) in the MAC layer. Here, the RRC signaling and/or the MAC CE may also be referred to as a higher layer signal (higher layer signaling).

The PUSCH and the PDSCH may be at least used to transmit the RRC signaling and/or the MAC CE. Here, the RRC signaling transmitted via the PDSCH from the base station apparatus 3 may be signaling common to multiple terminal apparatuses 1 within a serving cell. The signaling common to multiple terminal apparatuses 1 within a serving cell is also referred to as common RRC signaling. The RRC signaling transmitted via the PDSCH from the base station apparatus 3 may be signaling dedicated to a certain terminal apparatus 1 (also referred to as dedicated signaling or UE specific signaling). The signaling dedicated to the terminal apparatus 1 is also referred to as dedicated RRC signaling. A higher layer parameter specific to a serving cell may be transmitted using signaling common to a plurality of terminal apparatuses 1 within the serving cell or using signaling dedicated to a certain terminal apparatus 1. A UE-specific higher layer parameter may be transmitted using signaling dedicated to a certain terminal apparatus 1.

BCCH (Broadcast Control CHannel), CCCH (Common Control CHannel), and DCCH (Dedicated Control CHannel) are logical channels. For example, the BCCH is a higher layer channel for transmitting an MIB. The CCCH (common control channel) is a higher layer channel for transmitting common information in a plurality of terminal apparatuses 1. Here, the CCCH may be used, for example, for a terminal apparatus 1 that is not RRC-connected. The DCCH (Dedicated Control CHannel) is a higher layer channel that is at least used to transmit dedicated control information to the terminal apparatus 1. Here, the DCCH may be used, for example, for a terminal apparatus 1 that is RRC-connected.

The BCCH in the logical channels may be mapped to the BCH, the DL-SCH, or the UL-SCH in the transport channels. The CCCH in the logical channels may be mapped to the DL-SCH or the UL-SCH in the transport channels. The DCCH in the logical channels may be mapped to DL-SCH or UL-SCH in the transport channels.

The UL-SCH in the transport channels may be mapped to the PUSCH in the physical channels. The DL-SCH in the transport channels may be mapped to the PDSCH in the physical channels. The BCH in the transport channels may be mapped to the PBCH in the physical channels.

Hereinafter, an example of a configuration of a terminal apparatus 1 according to one aspect of the present embodiment will be described.

Figure 6:
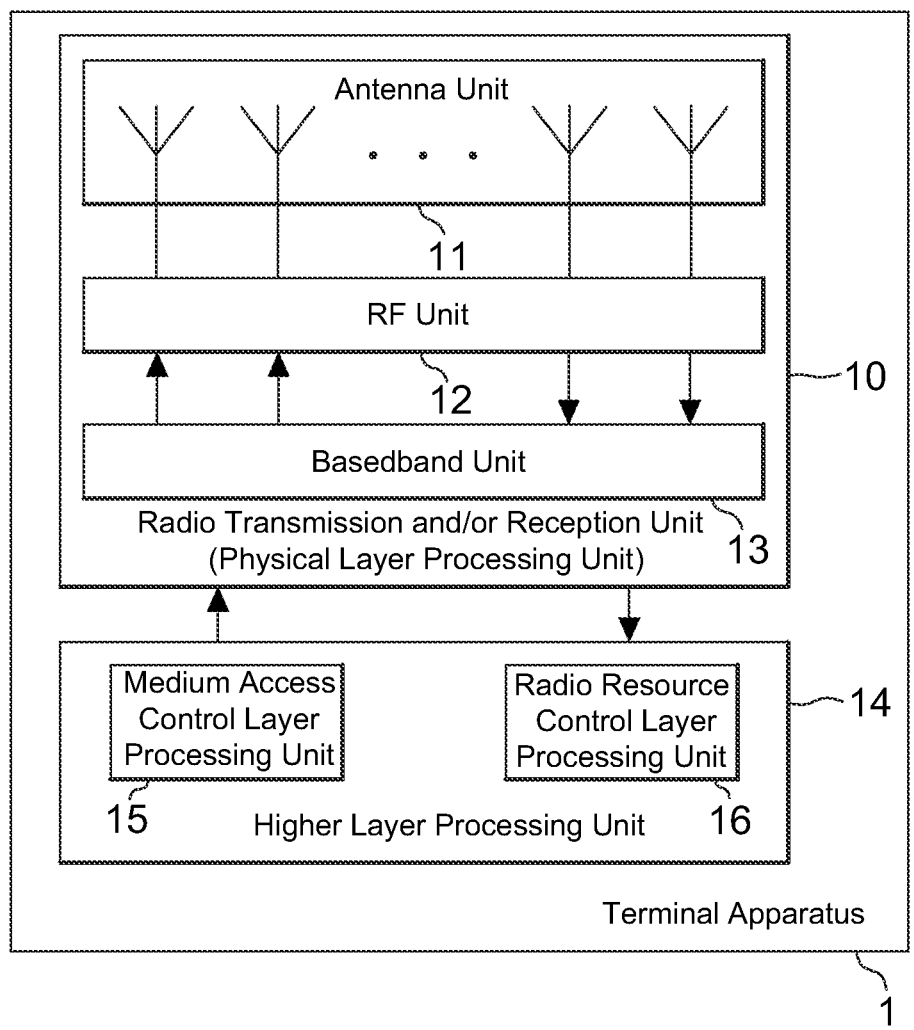
FIG. 6 is a schematic block diagram showing a configuration of a terminal apparatus according to one aspect of the present embodiment.

FIG. 6 is a schematic block diagram showing a configuration of a terminal apparatus 1 according to one aspect of the present embodiment. As shown in FIG. 6, the terminal apparatus 1 includes a radio transmission and/or reception unit 10 and a higher layer processing unit 14. The radio transmission and/or reception unit 10 includes an antenna unit 11, an RF (Radio Frequency) unit 12, and a baseband unit 13. The higher layer processing unit 14 includes at least some or all of a medium access control layer processing unit 15 and a radio resource control layer processing unit 16. The radio transmission and/or reception unit 10 is also referred to as a transmission unit, a reception unit, or a physical layer processing unit.

The higher layer processing unit 14 outputs uplink data (transport block) generated by a user operation or the like to the radio transmission and/or reception unit 10. The higher layer processing unit 14 performs processing of a MAC layer, a PDCP (Packet Data Convergence Protocol) layer, an RLC (Radio Link Control) layer, and an RRC layer.

The medium access control layer processing unit 15 included in the higher layer processing unit 14 performs the processing of the MAC layer.

The radio resource control layer processing unit 16 included in the higher layer processing unit 14 performs processing of the RRC layer. The radio resource control layer processing unit 16 manages various types of configuration information/parameters of the present terminal apparatus. The radio resource control layer processing unit 16 sets various types of configuration information/parameters based on a higher layer signal received from the base station apparatus 3. That is, the radio resource control layer processing unit 16 sets various types of configuration information/parameters based on information indicating the various types of configuration information/parameters received from the base station apparatus 3. The parameter may be a higher layer parameter.

The radio transmission and/or reception unit 10 performs processing of the physical layer, such as modulation, demodulation, encoding, decoding, and the like. The radio transmission and/or reception unit 10 demultiplexes, demodulates, and decodes the received signal, and then outputs decoded information to the higher layer processing unit 14. The radio transmission and/or reception unit 10 generates a physical signal by modulating, encoding data, and generating a baseband signal (conversion into a time continuous signal), and then transmits the physical signal to the base station apparatus 3. The radio transmission and/or reception unit 10 can perform carrier detection.

The RF unit 12 converts (down-converts) a signal received via the antenna unit 11 into a baseband signal by quadrature demodulation, and then removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a cyclic prefix (CP) from the converted digital signal, performs a fast Fourier transform (FFT) on the signal from which the CP has been removed, and extracts a signal in the frequency domain.

The baseband unit 13 generates an OFDM symbol by performing an inverse fast Fourier transform (IFFT) on data, adds a CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal to a signal with a carrier frequency, and transmits the up-converted signal via the antenna unit 11. In addition, the RF unit 12 amplifies power. In addition, the RF unit 12 may provide a function of controlling transmission power. The RF unit 12 may also be referred to as a transmission power control unit.

Hereinafter, an example of a configuration of a base station apparatus 3 according to one aspect of the present embodiment will be described.

Figure 7:
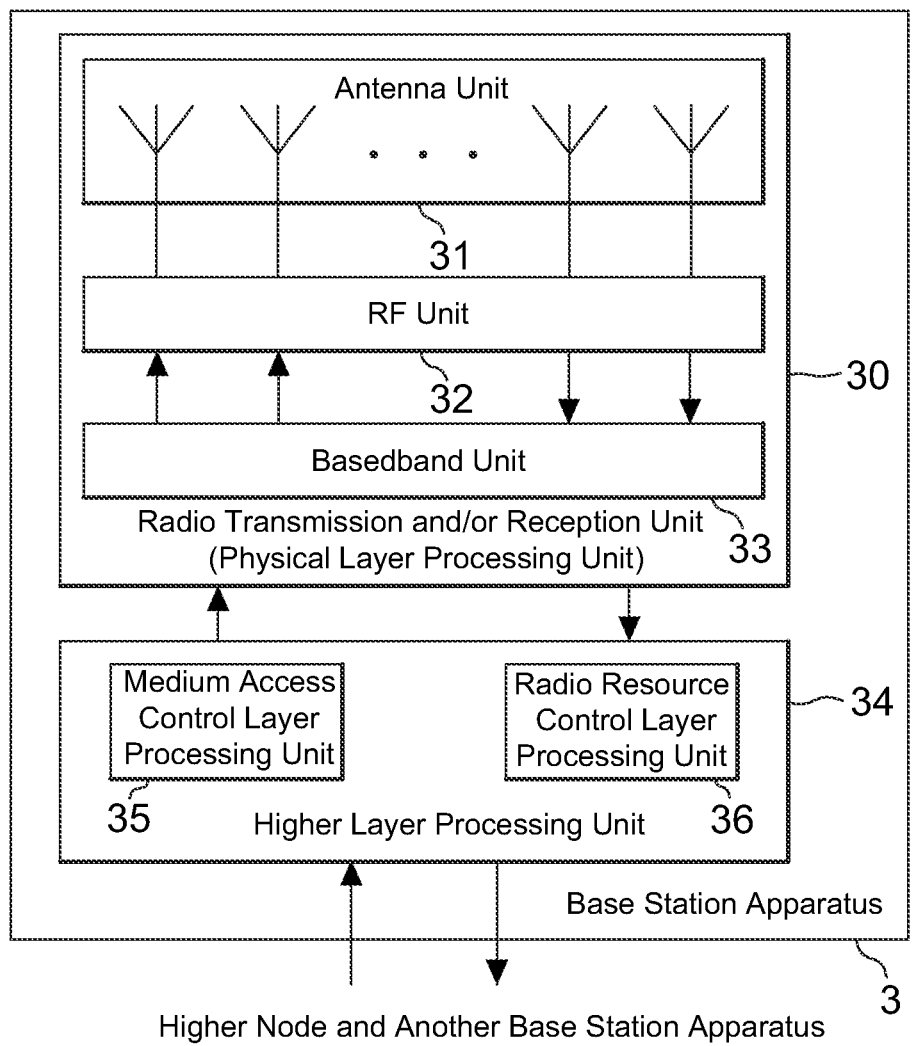
FIG. 7 is a schematic block diagram showing a configuration of a base station apparatus according to one aspect of the present embodiment.

FIG. 7 is a schematic block diagram showing a configuration of a base station apparatus 3 according to one aspect of the present embodiment. As shown in FIG. 7, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmission unit, a reception unit, or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs the processing of the MAC layer.

The radio resource control layer processing unit 36 included in the higher layer processing unit 34 performs processing of the RRC layer. The radio resource control layer processing unit 36 generates or acquires from a higher node, downlink data (transport block) allocated on a PDSCH, system information, an RRC message, a MAC CE, and the like, and outputs them to the radio transmission and/or reception unit 30. In addition, the radio resource control layer processing unit 36 manages various types of configuration information/parameters for each terminal apparatus 1. The radio resource control layer processing unit 36 can set various types of configuration information/parameters for each terminal apparatus 1 via a higher layer signal. That is, the radio resource control layer processing unit 36 transmits/reports information indicating various types of configuration information/parameters.

Since the functionality of the radio transmission and/or reception unit 30 is the same as that of the radio transmission and/or reception unit 10, the description thereof is omitted.

Each of the units marked with reference numerals 10 to 16 provided by the terminal apparatus 1 may be configured as a circuit. Each of the units marked with reference numerals 30 to 36 provided by the base station apparatus 3 may be configured as a circuit. Some or all of the units marked with reference numerals 10 to 16 provided by the terminal apparatus 1 may be configured as a memory and a processor connected to the memory. Some or all of the units marked with reference numerals 30 to 36 provided by the base station apparatus 3 may be configured as a memory and a processor connected to the memory. The various aspects (operations and/or processes) according to the present embodiment may be realized (performed) in a memory and a processor connected to the memory included in the terminal apparatus 1 and/or the base station apparatus 3.

Figure 8:
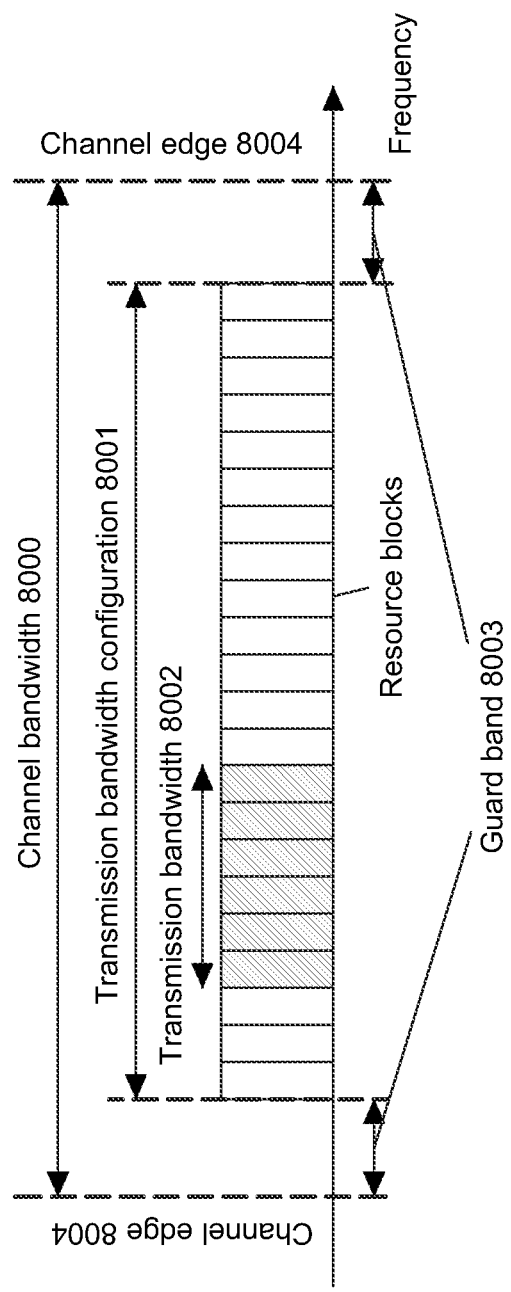
FIG. 8 is a diagram showing an example of a carrier configuration according to one aspect of the present embodiment.

FIG. 8 is a diagram showing an example of a carrier configuration according to one aspect of the present embodiment. In FIG. 8, the horizontal axis indicates frequency. In addition, a channel bandwidth 8000 may be defined by a continuous frequency resource. The channel bandwidth 8000 may be a frequency resource defined in accordance with regulations, radio wave laws, and other reasons in each country. In addition, a transmission bandwidth configuration 8001 may include a subset of frequency resources included in the channel bandwidth 8000. In addition, the transmission bandwidth configuration 8001 may include one or more resource blocks. A block indicated by oblique lines is also referred to as an active resource block, and a frequency band formed by active resource blocks is also referred to as a transmission bandwidth 8002. The frequency resource inside the channel bandwidth 8000 and outside the transmission bandwidth configuration 8001 is referred to as a guard band 8003. In addition, both ends of the channel bandwidth 8000 are referred to as channel edges 8004.

The channel bandwidth 8000 may be an uplink channel bandwidth or a downlink channel bandwidth. The transmission bandwidth configuration 8001 may be an uplink transmission bandwidth configuration or a downlink transmission bandwidth configuration. The transmission bandwidth 8002 may be an uplink transmission bandwidth or a downlink transmission bandwidth. The guard band 8003 may be an uplink guard band or a downlink guard band. The channel edge 8004 may be an uplink channel edge or a downlink channel edge.

FIG. 9 is a diagram showing a configuration example of a maximum number $N_{RB}$ of resource blocks of the transmission bandwidth configuration 8001 according to one aspect of the present embodiment. The uppermost column of the table shown in FIG. 9 indicates the width of the frequency resource of the channel bandwidth 8000. In other words, for example, the width of the frequency resource of the channel bandwidth 8000 may be any of 5 MHz, 10 MHz, 15 MHz, 20 MHz, 25 MHz, 30 MHz, 40 MHz, 50 MHz, 60 MHz, 80 MHz, 90 MHz, and 100 MHz. In addition, the leftmost column of the table shown in FIG. 9 indicates subcarrier spacing (Unit: kHz). In addition, each of the elements that are not included in the uppermost column of the table and not included in the leftmost column of the table shown in FIG. 9 indicates the maximum number $N_{RB}$ of resource blocks of the transmission bandwidth configuration 8001. For example, in a case that the width of the frequency resource of the channel bandwidth 8000 is 5 MHz and the subcarrier spacing is 15 kHz, the maximum number $N_{RB}$ of resource blocks of the transmission bandwidth configuration 8001 may be 25. In addition, in a case that the width of the frequency resource of the channel bandwidth 8000 is 30 MHz and the subcarrier spacing is 30 kHz, the maximum number $N_{RB}$ of resource blocks of the transmission bandwidth configuration 8001 may be 78. In addition, in a case that the width of the frequency resource of the channel bandwidth 8000 is 5 MHz and the subcarrier spacing is 60 kHz, the maximum number $N_{RB}$ of resource blocks of the transmission bandwidth configuration 8001 may be N/A. N/A may not be defined. In other words, a case that the maximum number $N_{RB}$ of resource blocks of the transmission bandwidth configuration 8001 corresponding to a set/pair of the width of the frequency resource of a certain channel bandwidth 8000 and the value of a certain subcarrier spacing is N/A may mean that the set/pair of the width of the frequency resource of the certain channel bandwidth 8000 and the value of the certain subcarrier spacing is not defined.

The transmission bandwidth configuration 8001 may be at least used to set requirements associated with some or all of out-of-band radiation, in-channel-band reception sensitivity, and adjacent channel band reception sensitivity (adjacent channel sensitivity). For example, some or all of the out-of-band radiation, the in-channel-band reception sensitivity, and the adjacent channel band reception sensitivity may be given at least based on a number N of resource blocks of a certain transmission bandwidth configuration 8001. For example, the adjacent channel band reception sensitivity may be given for each set/pair of the width of the frequency resource of a certain channel bandwidth 8000 and a transmission power value in a number N of resource blocks of a certain transmission bandwidth configuration 8001. In addition, some or all of the out-of-band radiation, the in-channel-band reception sensitivity, and the adjacent channel band reception sensitivity may be given at least based on the maximum number $N_{RB}$ of resource blocks of a certain transmission bandwidth configuration 8001. For example, the adjacent channel band reception sensitivity may be given for each set/pair of the width of the frequency resource of a certain channel bandwidth 8000 and a transmission power value in the maximum number $N_{RB}$ of resource blocks of a certain transmission bandwidth configuration 8001.

The transmission bandwidth 8002 may indicate a set of resource blocks in which transmission of a physical signal is performed. For example, the transmission bandwidth 8002 may correspond to a PDSCH frequency domain resource allocation. In addition, the transmission bandwidth 8002 may correspond to PUSCH frequency domain resource allocation. The resource block included in the transmission bandwidth 8002 is referred to as an active resource block. The transmission bandwidth 8002 may be given at least based on the value of a frequency domain resource allocation field included in the DCI format.

FIG. 10 is a diagram showing a configuration example of a minimum value of the guard band 8003 configured for the channel bandwidth 8000 according to one aspect of the present embodiment. The uppermost column of the table shown in FIG. 10 indicates the width of the frequency resource of the channel bandwidth 8000. In addition, the leftmost column of the table shown in FIG. 10 indicates subcarrier spacing (Unit: kHz). In addition, each of the elements that are not included in the uppermost column of the table and not included in the leftmost column of the table shown in FIG. 10 indicates a minimum value (Unit: kHz) of the guard band 8003 configured for the channel bandwidth 8000. For example, in a case that the width of the frequency resource of the channel bandwidth 8000 is 5 MHz and the subcarrier spacing is 15 kHz, the minimum value of the guard band 8003 may be 242.5 kHz. In addition, in a case that the width of the frequency resource of the channel bandwidth 8000 is 30 MHz and the subcarrier spacing is 30 kHz, the minimum value of the guard band 8003 may be 945 kHz. In addition, in a case that the width of the frequency resource of the channel bandwidth 8000 is 5 MHz and the subcarrier spacing is 60 kHz, the minimum value of the guard band 8003 may be N/A.

The relationship among the minimum value of the guard band 8003, the channel bandwidth 8000, and the subcarrier spacing shown in FIG. 10 can be given by (CHBW-RBvalue SCS 12)/2-SCS/2. Here, the CHBW may be the width of the frequency resource of the channel bandwidth 8000, and the unit may be kHz. In addition, the RBvalue may be the number N of resource blocks of the transmission bandwidth configuration 8001 included in the channel bandwidth 8000. In addition, the RBvalue may be the maximum number $N_{RB}$ of resource blocks of the transmission bandwidth configuration 8001 included in the channel bandwidth 8000. In addition, the RBvalue may correspond to any of the maximum number $N_{RB}$ of resource blocks of the transmission bandwidth configuration 8001 in the table shown in FIG. 9. In addition, SCS may be a subcarrier spacing, and the unit is kHz.

The frequency band of the guard band 8003 given based on the transmission bandwidth configuration 8001 configured in the channel bandwidth 8000 may be set as being not smaller than the minimum value of the guard band 8003.

Figure 11:
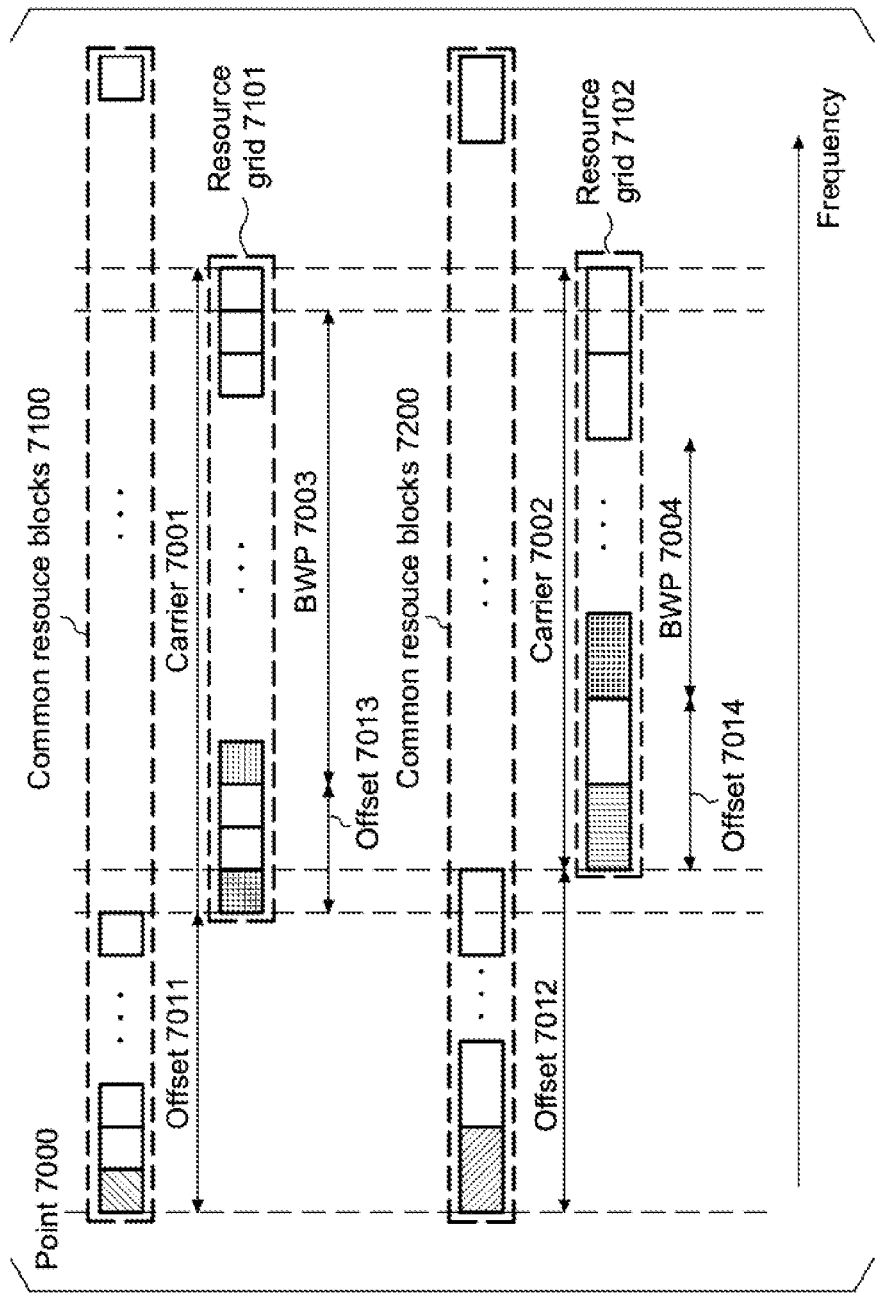
FIG. 11 is a diagram showing an example of communication between a base station apparatus and a terminal apparatus according to one aspect of the present embodiment.

FIG. 11 is a diagram showing an example of communication between a base station apparatus 3 and a terminal apparatus 1 according to one aspect of the present embodiment. In FIG. 11, the horizontal axis indicates frequency. A point 7000 is an identifier for identifying a certain subcarrier. The point 7000 is referred to as a point A. A set of common resource blocks 7100 includes one or more resource blocks for a subcarrier spacing configuration $\mu_1$. The point 7000 may be given at least based on a higher layer parameter. For example, the point A may be given at least based on a subcarrier #0 with the smallest index among subcarriers mapped with the PBCH, an offset parameter A, and an offset parameter B. The subcarrier #0 with the smallest index among subcarriers mapped with PBCH is also referred to as a point 6998. Here, the subcarrier #0 may be a subcarrier of an index 0. The subcarrier #0 of a certain resource block may be a subcarrier mapped to a position of the lowest frequency in the certain resource block.

The offset parameter A may be given at least based on one or both of a parameter included in the PBCH and/or scrambling of a DMRS associated with the PBCH. The offset parameter A may be an offset value indicating the difference between a point 6998 and a point 6999. The offset value may be given by a number of subcarriers. For example, the subcarrier may correspond to a subcarrier with a subcarrier spacing configuration $\mu=0$.

The point 6999 may be a subcarrier #0 in a resource block of an index $N^{CRB}_{SSB}$ in the set of common resource blocks 7100. The index $N^{CRB}_{SSB}$ may be given at least based on a higher layer parameter. The index $N^{CRB}_{SSB}$ may be given at least based on an SIB1.

A reference point of the set of common resource blocks 7100 is a resource block including the point 7000 and corresponding to the subcarrier spacing configuration $\mu_1$. In FIG. 11, the block indicated by upper-right diagonal lines indicates a reference point of the set of common resource blocks 7100.

An offset 7011 shown in FIG. 11 is at least used to indicate a resource grid 7101 given for a subcarrier spacing setting $\mu_1$ and a carrier 7001. The block indicated by a grid pattern shown in FIG. 11 indicates a reference point of the resource grid 7101. The reference point of the resource grid 7101 corresponds to a common resource block of an index N 7011 of the set of common resource blocks 7100. The N 7011 is an offset value indicating the difference of the resource blocks from the reference point of the set of common resource blocks 7100 to the reference point of the resource grid 7101. The N 7011 is a value of the offset 7011.

An offset 7013 shown in FIG. 11 is at least used to indicate a BWP 7003. The resource block indicated by horizontal lines shown in FIG. 11 indicates a reference point of the BWP 7003. For example, the reference point of the BWP 7003 may be a physical resource block of an index 0.

A set of common resource blocks 7200 includes one or more resource blocks for a subcarrier spacing configuration $\mu_2$. A reference point of the set of common resource blocks 7200 is a resource block including the point 7000 and corresponding to the subcarrier spacing configuration $\mu_2$. In FIG. 11, the block indicated by upper-left diagonal lines indicates a reference point of the set of common resource blocks 7200.

An offset 7012 shown in FIG. 11 is at least used to indicate a resource grid 7102 given for a subcarrier spacing setting $\mu_2$ and a carrier 7002. The block indicated by vertical lines shown in FIG. 11 indicates a reference point of the resource grid 7102. The reference point of the resource grid 7102 corresponds to a common resource block of an index N 7012 of the set of common resource blocks 7200. The N 7012 is an offset value indicating the difference of the resource blocks from the reference point of the set of common resource blocks 7200 to the reference point of the resource grid 7102. The N 7012 is a value of the offset 7012. Here, in FIG. 11, a case that a relationship of $\mu_1+1=\mu_2$ is established has been described. However, in one aspect of the present embodiment, the relationship between the subcarrier spacing configurations $\mu_1$ and $\mu_2$ may not be limited to the example shown in FIG. 11.

An offset 7014 shown in FIG. 11 is at least used to indicate a BWP 7004. The resource block indicated by a dot pattern shown in FIG. 11 indicates a reference point of the BWP 7004. For example, the reference point of the BWP 7004 may be a physical resource block of an index 0.

A certain transmission bandwidth configuration may be corresponded to a certain carrier. For example, the reference point of a certain transmission bandwidth configuration may coincide with the reference point of a resource grid of a certain carrier corresponding to the certain transmission bandwidth configuration. In addition, a set of resource blocks included in the certain transmission bandwidth configuration may coincide with a set of resource blocks included in a resource grid of the carrier corresponding to the certain transmission bandwidth configuration.

The configuration of the resource grid for a certain carrier may be given at least based on a higher layer parameter (SCS-specificCarrier) associated with the carrier. The higher layer parameter associated with the carrier may include a parameter indicating a subcarrier spacing configuration $\mu$ of the carrier. The higher layer parameter associated with the carrier for the subcarrier spacing configuration $\mu$ may include at least a parameter indicating an offset from a reference point of the common resource blocks for the subcarrier spacing configuration $\mu$ to a reference point of a resource grid for the carrier. The higher layer parameter associated with the carrier for a certain subcarrier spacing configuration $\mu$ may include at least a parameter indicating the number of resource blocks included in the carrier.

The higher layer parameter associated with the carrier may be included in a common RRC parameter or in a dedicated RRC parameter.

For example, in a case that a dedicated RRC parameter including a higher layer parameter associated with the carrier is given, the transmission bandwidth configuration 8001 may be given at least based on the dedicated RRC parameter. In addition, in a case that no dedicated RRC parameter including a higher layer parameter associated with the carrier is given, the transmission bandwidth configuration 8001 may be given at least based on a common RRC parameter including a higher layer parameter associated with the carrier. The common RRC parameter including a higher layer parameter associated with the carrier may be included in an SIB1.

For example, in a case that at least some or all of the following conditions 1 to 6 are satisfied, the transmission bandwidth configuration 8001 may be given at least based on an initial downlink BWP.

Condition 1: no dedicated RRC parameter including a higher layer parameter. associated with the carrier is given.

Condition 2: the mode of the terminal apparatus 1 is an idle mode.

Condition 3: the terminal apparatus 1 performs an initial connection.

Condition 4: the terminal apparatus 1 does not support at least one of frequency bands of one or more carriers given at least based on a higher layer parameter associated with the carrier and included in a common RRC parameter.

Condition 5: the terminal apparatus 1 supports the frequency band of an initial downlink BWP.

Condition 6: the terminal apparatus 1 supports the frequency band of a control resource set #0.

In a case that at least some or all of the conditions 1 to 6 are not satisfied, the transmission bandwidth configuration 8001 may be given at least based on a higher layer parameter associated with the carrier and included in the dedicated RRC parameter.

Here, the initial downlink BWP may be a downlink BWP of an index 0. In addition, a parameter for configuring the initial downlink BWP may be included in the common RRC parameter. In addition, a parameter for configuring the initial downlink BWP may be included in an SIB1.

Here, the control resource set #0 may be a control resource set of an index 0. In addition, a parameter for configuring the control resource set #0 may be included in the common RRC parameter. In addition, a parameter for configuring the control resource set #0 may be included in an MIB. In addition, the configuration of the control resource set #0 may be given at least based on four bits of the MSBs (Most Significant Bits) of a higher layer parameter PDCCH-ConfigSIB1.

Here, the fact that the terminal apparatus 1 supports a certain frequency band may mean that the terminal apparatus 1 has a function of transmitting and/or receiving signals in the frequency band. In addition, the fact that the terminal apparatus 1 does not support a certain frequency band may mean that the terminal apparatus 1 does not have at least one of functions of transmitting and receiving signals in the frequency band.

For example, in a case that no dedicated RRC parameter including a higher layer parameter associated with a first carrier is given, a common RRC parameter including a higher layer parameter associated with a second carrier is given, and some or all of one or more given at least based on the higher layer parameter associated with the second carrier are supported, the transmission bandwidth configuration 8001 may be given at least based on the higher layer parameter associated with the second carrier.

For example, a resource grid for a carrier may be given at least based on a higher layer parameter associated with a second carrier and included in a common RRC parameter regardless of whether a dedicated RRC parameter including a higher layer parameter associated with a first carrier is given. In addition, a resource grid for a carrier may be given at least based on a higher layer parameter associated with a second carrier and included in a common RRC parameter.

The configuration of an initial downlink BWP for a certain subcarrier spacing configuration μ may be given at least based on an offset value from the reference point of a resource grid for a carrier for the certain subcarrier spacing configuration μ to the reference point of the initial downlink BWP. For example, the offset value may be included in common RRC signaling. For example, the reference point of the resource grid for the carrier may be given at least based on a higher layer parameter associated with a second carrier and included in a common RRC parameter.

The configuration of a downlink BWP, which is different from an initial downlink BWP, for a certain subcarrier spacing configuration μ may be given at least based on an offset value from the reference point of a resource grid for a carrier for the certain subcarrier spacing configuration μ to the reference point of the downlink BWP. For example, the offset value may be included in a dedicated RRC parameter. For example, the reference point of the resource grid for the carrier may be given at least based on a higher layer parameter associated with a first carrier and included in a dedicated RRC parameter.

The configuration of a downlink BWP for a certain subcarrier spacing configuration may be given at least based on an offset value from the reference point of a resource grid for a carrier for the certain subcarrier spacing configuration μ to the reference point of the downlink BWP. For example, the offset value may be included in a higher layer parameter. For example, the reference point of the resource grid for the carrier may be given at least based on a higher layer parameter associated with a second carrier and included in a common RRC parameter.

The configuration of an initial uplink BWP for a certain subcarrier spacing configuration μ may be given at least based on an offset value from the reference point of a resource grid for a carrier for the certain subcarrier spacing configuration μ to the reference point of the initial uplink BWP. For example, the offset value may be included in common RRC signaling. For example, the reference point of the resource grid for the carrier may be given at least based on a higher layer parameter associated with a second carrier and included in a common RRC parameter.

The configuration of an uplink BWP, which is different from an initial uplink BWP, for a certain subcarrier spacing configuration μ may be given at least based on an offset value from the reference point of a resource grid for a carrier for the certain subcarrier spacing configuration to the reference point of the uplink BWP. For example, the offset value may be included in a dedicated RRC parameter. For example, the reference point of the resource grid for the carrier may be given at least based on a higher layer parameter associated with a first carrier and included in a dedicated RRC parameter.

The configuration of a uplink BWP for a certain subcarrier spacing configuration may be given at least based on an offset value from the reference point of a resource grid for a carrier for the certain subcarrier spacing configuration μ to the reference point of the uplink BWP. For example, the offset value may be included in a higher layer parameter. For example, the reference point of the resource grid for the carrier may be given at least based on a higher layer parameter associated with a second carrier and included in a common RRC parameter.

Hereinafter, aspects of various apparatuses according to one aspect of the present embodiment will be described.

(1) In order to achieve the above objective, the following means are adopted by the aspects of the present invention. That is, the first aspect of the present invention is to provide a terminal apparatus comprising: a configuration unit configured to configure a dedicated RRC parameter and a common RRC parameter; and a reception unit configured to receive a physical channel included in the transmission bandwidth configuration. The transmission bandwidth configuration is given at least based on an initial downlink DL BWP when at least one predetermined condition is satisfied; and the transmission bandwidth configuration is given at least based on a first parameter included in the dedicated RRC parameter when the at least one predetermined condition is not satisfied. The at least one predetermined condition includes some or all of a condition 1, a condition 2, a condition 3, a condition 4, a condition 5, and a condition 6. The condition 1 is that no dedicated RRC parameter is given; the condition 2 is that the terminal apparatus is in an idle mode; the condition 3 is that the terminal apparatus performs an initial connection; the condition 4 is that the terminal apparatus does not support at least one of frequency bands of one or more carriers given at least based on a second parameter included in the common RRC parameter; the condition 5 is that the terminal apparatus supports a frequency band of an initial downlink BWP; and the condition 6 is that the terminal apparatus supports a frequency band of a control resource set of an index 0.

(2) A second aspect of the present invention is to provide a terminal apparatus comprising: a configuration unit configured to configure a dedicated RRC parameter and a common RRC parameter; and a reception unit configured to receive a physical channel in a downlink BWP included in the transmission bandwidth configuration. The transmission bandwidth configuration is given at least based on a first parameter included in the common RRC parameter; and a configuration of the downlink BWP is given at least based on a second parameter included in the dedicated RRC parameter.

(3) In addition, in the second aspect of the present invention, an offset from a first resource block of a carrier given at least based on the first parameter to a first resource block of the downlink BWP is indicated by the first parameter.

(4) A third aspect of the present invention is to provide a base station apparatus comprising: a configuration unit configured to configure a dedicated RRC parameter and a common RRC parameter; and a transmission unit configured to transmit a physical channel in a downlink BWP included in the transmission bandwidth configuration. The transmission bandwidth configuration is given at least based on a first parameter included in the common RRC parameter; and a configuration of the downlink BWP is given at least based on a second parameter included in the dedicated RRC parameter.

(5) In addition, in the third aspect of the present invention, an offset from a first resource block of a carrier given at least based on the first parameter to a first resource block of the downlink BWP is indicated by the first parameter.

A program operating in the base station apparatus 3 and the terminal apparatus 1 according to the present invention may be a program that controls a central processing unit (CPU) and the like (i.e., a program to cause a computer to function) to implement the functions of the above-described embodiment according to the present invention. Further, the information processed by these apparatuses is temporarily stored in RAM (Random Access Memory) while being processed, then stored in various types of ROM (Read Only Memory) such as a Flash ROM and HDD (Hard Disk Drive), and read, modified or rewritten by the CPU as necessary.

It should be noted that a part of the terminal apparatus 1 and the base station apparatus 3 according to the above embodiment may be realized by a computer. In that case, it may be realized by recording a program for realizing the control function on a computer-readable recording medium, and causing a computer system to read the program recorded on the recording medium for execution.

It should be noted that the "computer system" mentioned here indicates a computer system built into the terminal apparatus 1 or the base station apparatus 3, and the computer system may include an OS and hardware components such as a peripheral apparatus. In addition, the "computer-readable recording medium" indicates a portable medium such as a flexible disk, an optical disk, a ROM, a CD-ROM, and the like, and a storage device such as a hard disk built into the computer system.

Also, the "computer-readable recording medium" may include a recording medium for dynamically storing programs for a short time, such as a communication line in the case of transmitting the programs via a network such as the internet or a communication line such as a telephone line, and may include a recording medium for storing the programs for a fixed period of time, such as a volatile memory within a computer system of a server or a client in such a case. Besides, the above-mentioned program may be configured to realize some of the functions described above, and also may be configured to be capable of realizing the functions described above in combination with a program already recorded in the computer system.

In addition, the base station apparatus 3 according to the above-mentioned embodiment may be implemented as an aggregation (apparatus group) including multiple apparatuses. Each of the apparatuses constituting such an apparatus group may include some or all portions of each function or each functional block of the base station apparatus 3 according to the above-mentioned embodiment. The apparatus group may be required to have each general function or each functional block of the base station apparatus 3. In addition, the terminal apparatus 1 according to the above-mentioned embodiment can also communicate with a base station apparatus implemented as aggregation.

In addition, the base station apparatus 3 according to the above-mentioned embodiment may serve as an EUTRAN (Evolved Universal Terrestrial Radio Access Network) and/or NG-RAN (NextGen RAN or NR RAN). In addition, the base station apparatus 3 according to the above-mentioned embodiment may have some or all of the functions of a higher layer node with respect to an eNodeB and/or gNB.

In addition, some or all portions of the terminal apparatus 1 and the base station apparatus 3 according to the above-mentioned embodiment may be implemented as an LSI typically functioning as an integrated circuit or may be implemented as a chip set. Each of the functional blocks of the terminal apparatus 1 and the base station apparatus 3 may be individually implemented as a chip, or some or all of the functional blocks of the same may be integrated into a chip. In addition, a circuit integration technique is not limited to the LSI, and may be implemented by a dedicated circuit or a general-purpose processor. In addition, with the advance in semiconductor technology, a circuit integration technology may appear to replace the LSI technology, and an integrated circuit based on such a technology can also be used.

Further, according to the above-mentioned embodiment, the terminal apparatus has been described as an example of a communication apparatus, but the present invention is not limited to such a terminal apparatus, and is applicable to a fixed-type or a stationary-type electronic equipment installed indoors or outdoors, for example, terminal apparatuses or communication apparatuses such as AV equipment, kitchen equipment, cleaning/washing equipment, an air-conditioning equipment, office equipment, a vending machine, and other household apparatuses.

The embodiments of the present invention have been described in detail with reference to the accompanying drawings, but the specific configuration is not limited to the embodiments and further includes design modification and the like without departing from the scope of the present invention. In addition, various modifications are possible within the scope of the present invention defined by claims, and embodiments that are made by suitably combining technical means disclosed according to the different embodiments are also included in the technical scope of the present invention. In addition, a configuration in which constituent elements, described in the respective embodiments and having mutually the same effects, are substituted for one another may also be included in the technical scope of the present invention.

INDUSTRIAL APPLICABILITY

One aspect of the present invention can be applied to, for example, a communication system, a communication equipment (e.g., a mobile phone apparatus, a base station apparatus, a wireless LAN apparatus, or a sensor apparatus), an integrated circuit (e.g., a communication chip), a program, or the like.

What is claimed is:

1. A user equipment (UE) communicating with a base station (BS) on a serving cell, the UE comprising:
   at least one processor; and
   at least one non-transitory computer-readable medium coupled to the at least one processor and storing one or more computer-executable instructions that, when executed by the at least one processor, cause the UE to:
   determine, based on a UE-specific radio resource control (RRC) parameter provided by a UE-specific RRC message or a parameter provided by system information block 1 (SIB1), a transmission bandwidth configuration, wherein the parameter indicates frequency location and size of an initial downlink (DL) bandwidth part (BWP); and
   receive a DL-shared channel (SCH) in an active DL BWP in a carrier corresponding to the transmission bandwidth configuration, wherein:
   in a case that the UE-specific RRC parameter is provided, the transmission bandwidth configuration is determined based on the UE-specific RRC parameter, and
   in a case that the UE-specific RRC parameter is not provided, the transmission bandwidth configuration is determined based on the parameter.

2. The UE of claim 1, wherein, in a case that the UE-specific RRC parameter is not provided, the transmission bandwidth configuration is determined further based on whether the UE supports a bandwidth of the initial DL BWP.

3. A base station (BS) communicating with a user equipment (UE) on a serving cell, the BS comprising:
   at least one processor; and
   at least one non-transitory computer-readable medium coupled to the at least one processor and storing one or more computer-executable instructions that, when executed by the at least one processor, cause the BS to:
   determine, based on a UE-specific radio resource control (RRC) parameter provided by a UE-specific RRC message or a parameter provided by system information block 1 (SIB1), a transmission bandwidth configuration, wherein the parameter indicates frequency location and size of an initial downlink (DL) bandwidth part (BWP); and
   transmit a DL-shared channel (SCH) in an active DL BWP in a carrier corresponding to the transmission bandwidth configuration, wherein:
   in a case that the UE-specific RRC parameter is provided, the transmission bandwidth configuration is determined based on the UE-specific RRC parameter, and
   in a case that the UE-specific RRC parameter is not provided, the transmission bandwidth configuration is determined based on the parameter.

4. The BS of claim 3, wherein, in a case that the UE-specific RRC parameter is not provided, the transmission bandwidth configuration is determined further based on whether the UE supports a bandwidth of the initial DL BWP.

5. A method performed by a user equipment (UE) communicating with a base station (BS) on a serving cell, the method comprising:
   determining, based on a UE-specific radio resource control (RRC) parameter provided by a UE-specific RRC message or a parameter provided by system information block 1 (SIB1), a transmission bandwidth configuration, wherein the parameter indicates frequency location and size of an initial downlink (DL) bandwidth part (BWP); and
   receiving a DL-shared channel (SCH) in an active DL BWP in a carrier corresponding to the transmission bandwidth configuration, wherein:
   in a case that the UE-specific RRC parameter is provided, the transmission bandwidth configuration is determined based on the UE-specific RRC parameter, and
   in a case that the UE-specific RRC parameter is not provided, the transmission bandwidth configuration is determined based on the parameter.

6. The method of claim 5, wherein, in a case that the UE-specific RRC parameter is not provided, the transmission bandwidth configuration is determined further based on whether the UE supports a bandwidth of the initial DL BWP.

* * * * *